US012375289B2

(12) United States Patent
Dahmen et al.

(10) Patent No.: US 12,375,289 B2
(45) Date of Patent: Jul. 29, 2025

(54) USING MULTI-FACTOR AND/OR INHERENCE-BASED AUTHENTICATION TO SELECTIVELY ENABLE PERFORMANCE OF AN OPERATION PRIOR TO OR DURING RELEASE OF CODE

(71) Applicant: Microsoft Technology Licensing, LLC, Redmond, WA (US)

(72) Inventors: Karen Lowe Dahmen, Sammamish, WA (US); Eugene Wilson Hodges, IV, Holly Springs, NC (US); John Michael Walton, Woodinville, WA (US); Kadri Tahsildoost, Bellevue, WA (US); Filip Šebesta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 17/084,274

(22) Filed: Oct. 29, 2020

(65) Prior Publication Data

US 2022/0141029 A1 May 5, 2022

(51) Int. Cl.
*H04L 29/06* (2006.01)
*G06F 8/60* (2018.01)
*H04L 9/32* (2006.01)

(52) U.S. Cl.
CPC .............. *H04L 9/3247* (2013.01); *G06F 8/60* (2013.01); *H04L 9/3231* (2013.01); *H04L 9/3239* (2013.01)

(58) Field of Classification Search
None
See application file for complete search history.

(56) References Cited

U.S. PATENT DOCUMENTS 7,602,910 B2 * 10/2009 Johansson .............. G06F 21/33
380/44
9,477,823 B1 * 10/2016 Ott ........................ G06F 21/316
(Continued)

FOREIGN PATENT DOCUMENTS

| EP | 1626326 A2 | 2/2006 |
|----|-----------|--------|
| GB | 2517732 A | 3/2015 |

OTHER PUBLICATIONS

"International Search Report and Written Opinion Issued in PCT Application No. PCT/US21/045286", Mailed Date: Nov. 29, 2021, 11 Pages.

(Continued)

*Primary Examiner* — Eleni A Shiferaw
*Assistant Examiner* — Hassan A Hussein
(74) *Attorney, Agent, or Firm* — Wade IP Law PLLC

(57) ABSTRACT

Techniques are described herein that are capable of using multi-factor and/or inherence-based authentication to selectively enable performance of an operation prior to or during release of code. For example, a user-specific digital signature that identifies a user of a code development service is generated based at least in part on factor(s) obtained from the user as a result of initiating or receiving a request to perform an operation with regard to the code prior to or during the release of the code. Multi-factor and/or inherence-based authentication may be selectively performed based at least in part on the user-specific digital signature. The performance of the operation is selectively enabled based at least in part on whether the user is authenticated.

20 Claims, 8 Drawing Sheets

(56) References Cited

U.S. PATENT DOCUMENTS

| | | | |
|---|---|---|---|
| 11,491,642 B2* | 11/2022 | Skaaksrud | G05D 1/0276 |
| 2016/0365981 A1* | 12/2016 | Medvinsky | G06F 21/57 |
| 2017/0085563 A1* | 3/2017 | Royyuru | G06Q 20/12 |
| 2017/0149774 A1* | 5/2017 | Blinn | H04L 63/083 |
| 2019/0268159 A1* | 8/2019 | High | H04L 9/3231 |
| 2019/0294528 A1* | 9/2019 | Avisror | G06F 11/3698 |
| 2019/0294531 A1* | 9/2019 | Avisror | G06F 11/3698 |
| 2019/0305964 A1* | 10/2019 | Hamel | H04L 9/0891 |
| 2020/0228336 A1* | 7/2020 | Streit | H04L 9/3231 |
| 2020/0236116 A1* | 7/2020 | Bower | G06K 19/0723 |
| 2020/0327100 A1* | 10/2020 | Androulaki | H04L 9/0643 |
| 2021/0019586 A1* | 1/2021 | Dreifus | G06F 21/34 |
| 2021/0029151 A1* | 1/2021 | Brooks | H04L 9/3218 |
| 2021/0320801 A1* | 10/2021 | Wyss | G06V 40/171 |
| 2021/0366289 A1* | 11/2021 | Salles | H04W 4/029 |
| 2021/0367786 A1* | 11/2021 | Sheets | H04L 9/0894 |
| 2021/0382814 A1* | 12/2021 | Moondhra | G06F 11/368 |
| 2021/0397430 A1* | 12/2021 | McFarland, Jr. | H04L 9/3239 |
| 2021/0397431 A1* | 12/2021 | McFarland, Jr. | G06F 8/65 |
| 2022/0058280 A1* | 2/2022 | Crompton | G06F 21/36 |
| 2023/0112622 A1* | 4/2023 | Jun | G06T 1/0028 |
| | | | 704/232 |

OTHER PUBLICATIONS

"CCBkdr", Retrieved from: https://attack.mitre.org/software/S0222/, Apr. 18, 2018, 12 Pages.

"NotPetya", Retrieved from: https://attack.mitre.org/software/S0368/, Mar. 26, 2019, 12 Pages.

"Smoke Loader", Retrieved from: https://attack.mitre.org/software/S0226/, Apr. 18, 2018, 12 Pages.

* cited by examiner

USING MULTI-FACTOR AND/OR INHERENCE-BASED AUTHENTICATION TO SELECTIVELY ENABLE PERFORMANCE OF AN OPERATION PRIOR TO OR DURING RELEASE OF CODE

BACKGROUND

Risks to code (e.g., software code or firmware code) supply chain security continue to increase. Attackers compromise legitimate developer and administrative accounts (e.g., GitHub, Azure DevOps, etc.) and machines and then use the compromised accounts and machines to supply malicious code to others who trust and depend on legitimate code providers. A variety of techniques has been proposed to increase security of code of such code providers. For instance, source and binary signatures and signature validation often are employed for this purpose. However, each such technique has its limitations. For example, the aforementioned techniques typically do not mitigate against compromised accounts and machines.

A variety of software supply chain compromises have impacted and continue to impact the software industry. For example, CCBkdr malware was injected into a signed version of CCleaner software and distributed from CCleaner's distribution website. In another example, the update mechanism of M.E.Doc tax accounting software was trojanized to spread NotPetya malware to systems when the software was updated on those systems. In yet another example, Smoke Loader, which is a malicious bot application that can be used to load other malware, was distributed through a compromised update to commonly used TOR client software. These and other malware continue to evolve and incorporate new capabilities in an effort to bypass security protocols of code providers.

SUMMARY

Various approaches are described herein for, among other things, using multi-factor and/or inherence-based authentication to selectively enable performance of an operation prior to or during release of software and/or firmware code (hereinafter referred to collectively as "code"). Multi-factor authentication is authentication that requires multiple factors (e.g., pieces of evidence) associated with a user to match respective reference factors to authenticate the user. Inherence-based authentication is authentication that requires an inherence factor associated with the user to match a reference inherence factor to authenticate the user. An inherence factor is a factor that indicates something that a user is or does. For instance, an inherence factor may be a biometric factor or a behaviometric factor. A biometric factor is a measurement or calculation of a physiological characteristic of a user. Examples of a physiological characteristic of a user include but are not limited to a face, hand, palm veins, palmprint, fingerprint, DNA, iris, and retina of the user. A measurement or calculation of a characteristic may indicate one or more dimensions of the characteristic (e.g., one or more dimensions of a feature of the characteristic or a spacing between multiple features of the characteristic). For instance, if a physiological characteristic of a user is the user's fingerprint, the biometric factor associated with the user's fingerprint may include a mapping of the ridges in the fingerprint. A behaviometric factor is a factor that indicates a pattern of behavior of a user. Examples of a pattern of behavior of a user include but are not limited to a voice, gait, and pattern of key press intervals (a.k.a. typing rhythm) of the user.

Other factors that may be taken into consideration to authenticate the user include but are not limited to knowledge factors and ownership factors. A knowledge factor is something a user knows. Examples of a knowledge factor include but are not limited to a password or a portion thereof, pass phrase, personal identification number (PIN), challenge response, and security question. An ownership factor is something a user has. Examples of an ownership factor include but are not limited to a smartcard, wrist band, ID card, security token, device implanted under the user's skin, software token, cell phone (having a built-in hardware token or storing a software token), and hardware authentication device (e.g., YubiKey®).

Examples of an operation for which performance may be selectively enabled include but are not limited to checking-in the code to a repository associated with the code development service, performing a review of the code, performing a build of the code, signing the code, releasing the code to end users, publishing the code to the end users, and deploying the code. Selectively enabling the performance of the operation may be performed at any point of the lifecycle of the code prior to completion of the release of the code to end users.

A first example approach uses multi-factor authentication to selectively enable performance of an operation prior to or during release of code. Prior to or during the release of the code, a request to perform the operation with regard to the code is initiated or the request is received from a user of a code development service. The code includes software code and/or firmware code. A user-specific digital signature that identifies the user is generated based on (e.g., based at least in part on) user-specific information, which is obtained from the user as a result of initiating or receiving the request. The user is selectively authenticated in accordance with a multi-factor authentication technique that requires multiple factors that are received from the user to match reference factors, which identify a reference user who is authorized to perform the operation with regard to the code, based on whether the user-specific digital signature that identifies the user matches a reference digital signature that identifies the reference user. The performance of the operation with regard to the code is selectively enabled based on whether the user is authenticated in accordance with the multi-factor authentication technique.

A second example approach uses inherence-based authentication to selectively enable performance of an operation prior to or during release of code. Prior to or during the release of the code, a request to perform the operation with regard to the code is initiated or the request is received from a user of a code development service. The code includes software code and/or firmware code. A user-specific digital signature that identifies the user is generated based on inherence identifier(s) of the user that are captured as a result of initiating or receiving the request. Each inherence identifier indicates something that the user is or does. The performance of the operation with regard to the code is selectively enabled based on whether the user-specific digital signature that identifies the user matches a reference digital signature that identifies a reference user who is authorized to perform the operation with regard to the code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
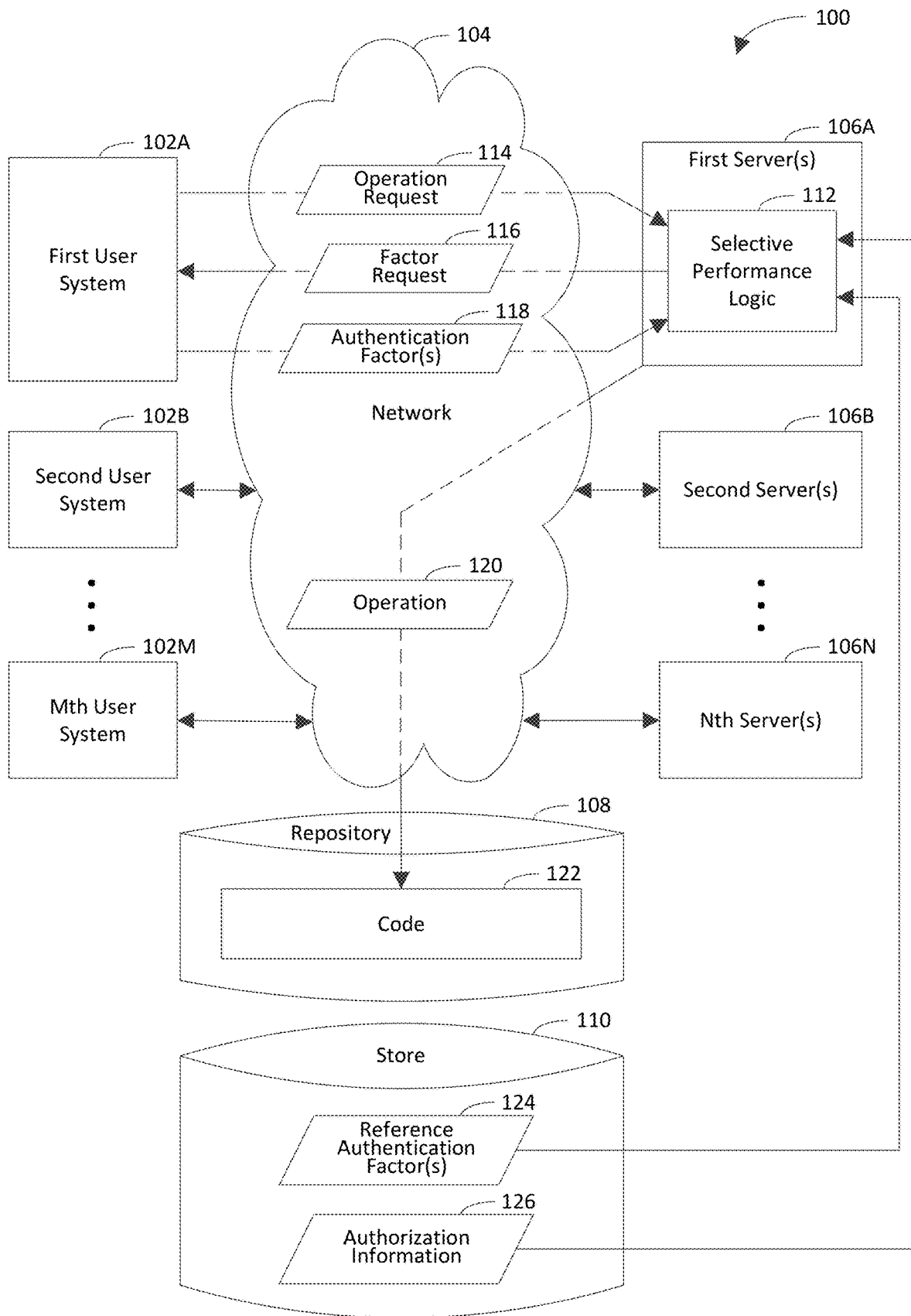
FIG. 1 is a block diagram of an example selective performance system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using multi-factor and/or inherence-based authentication to selectively enable performance of an operation prior to or during release of software and/or firmware code (hereinafter referred to collectively as "code"). Multi-factor authentication is authentication that requires multiple factors (e.g., pieces of evidence) associated with a user to match respective reference factors to authenticate the user. Inherence-based authentication is authentication that requires an inherence factor associated with the user to match a reference inherence factor to authenticate the user. An inherence factor is a factor that indicates something that a user is or does. For instance, an inherence factor may be a biometric factor or a behaviometric factor. A biometric factor is a measurement or calculation of a physiological characteristic of a user. Examples of a physiological characteristic of a user include but are not limited to a face, hand, palm veins, palmprint, fingerprint, DNA, iris, and retina of the user. A measurement or calculation of a characteristic may indicate one or more dimensions of the characteristic (e.g., one or more dimensions of a feature of the characteristic or a spacing between multiple features of the characteristic). For instance, if a physiological characteristic of a user is the user's fingerprint, the biometric factor associated with the user's fingerprint may include a mapping of the ridges in the fingerprint. A behaviometric factor is a factor that indicates a pattern of behavior of a user. Examples of a pattern of behavior of a user include but are not limited to a voice, gait, and pattern of key press intervals (a.k.a. typing rhythm) of the user. The pattern of key press intervals of the user may indicate a pattern of time periods that are defined by successive time instances at which the user presses a key of a virtual or physical keyboard. For example, the user pressing a key on the keyboard at a first time instance may begin a first time interval; the user pressing a key (e.g., the same key or a different key) on the keyboard at a second time instance may end the first time interval and begin a second time interval; the user pressing a key on the keyboard at a third time instance may end the second time interval and begin a third time interval, and so on.

Other factors that may be taken into consideration to authenticate the user include but are not limited to knowledge factors and ownership factors. A knowledge factor is something a user knows. Examples of a knowledge factor include but are not limited to a password or a portion thereof, pass phrase, personal identification number (PIN), challenge response, and security question. An ownership factor is something a user has. Examples of an ownership factor include but are not limited to a smartcard, wrist band, ID card, security token, device implanted under the user's skin, software token, cell phone (having a built-in hardware token or storing a software token), and hardware authentication device (e.g., YubiKey®).

Examples of an operation for which performance may be selectively enabled include but are not limited to checking-in the code to a repository associated with the code development service, performing a review of the code, performing a build of the code, signing the code, releasing the code to end users, publishing the code to the end users, and deploying the code. Selectively enabling the performance of the operation may be performed at any point of the lifecycle of the code prior to completion of the release of the code to end users.

Example techniques described herein have a variety of benefits as compared to conventional techniques for authenticating a user. For instance, the example techniques may be capable of increasing security of code, computing devices that operate on the code, repositories that store the code, and more generally a code supply chain through which the code is supplied. For example, the example techniques may reduce a likelihood that an attacker is able to compromise a legitimate developer or administrative account of a code development service or machine and/or to supply malicious code to users (e.g., end users) of the code development service. Accordingly, the example techniques may increase trust in the code development service.

By reducing a likelihood that an attacker is able to compromise a legitimate developer or administrative account of a code development service or machine, the example techniques may reduce an amount of time and/or resources (e.g., processor, memory, network bandwidth) that are consumed by computing devices (e.g., servers) that host the code development service. For instance, by implementing the example techniques, the computing devices need not use processor cycles, memory space, and network bandwidth that would otherwise be used to perform tasks that are initiated by the attacker. The example techniques may increase efficiency of the computing devices that host the code development service. The example techniques may increase user efficiency of the developers of the code and the administrators of the code development service.

By reducing a likelihood that an attacker is able to supply malicious code to users of the code development service, the example techniques may reduce an amount of time and/or resources (e.g., processor, memory, network bandwidth) that are consumed by computing devices (e.g., servers) of the users (e.g., computing devices used by the users to access the code development service). For instance, by implementing the example techniques, the computing devices need not use processor cycles, memory space, and network bandwidth that would otherwise be used to perform tasks that are caused by (e.g., defined by) the malicious code. The example techniques may increase efficiency of the computing devices of the users. The example techniques may increase user efficiency of the users of the code development service.

By reducing the amount of time and/or resources that are consumed to host or use the code development service, the example techniques may reduce a cost of hosting and/or using the code development service. For instance, the example techniques may reduce a cost of managing (e.g., securing) the code development service and the code that is handled by the code development service. By avoiding an attack that attempts to provide malicious code to computing devices, the example techniques may eliminate a cost associated with removing the malicious code from the computing devices and repairing the damage that the malicious code is configured to impose on such computing devices.

The example embodiments may be capable of reducing a likelihood of an attack that is staged from a traditionally multi-factor-exempt location, such as an intranet (e.g., corp-net) based login. The example techniques may enable auditing and verification of operations that are performed by approved developers and administrators, rejection of attempts to perform operations with regard to the code by attackers, and detection of compromises of a code supply chain through which the code is supplied.

FIG. 1 is a block diagram of an example selective performance system 100 in accordance with an embodiment. Generally speaking, the selective performance system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the selective performance system 100 uses multi-factor and/or inherence-based authentication to selectively enable performance of an operation 120 with regard to code 122 prior to or during release of the code 122. For example, the selective performance system 100 may use multi-factor and/or inherence-based authentication to selectively enable performance of the operation 120 with regard to a version of the code 122, which is selected from multiple versions of the code 122, prior to or during release of the selected version of the code 122. The code 122 includes software code and/or firmware code. Examples of code 122 include but are not limited to a mobile (e.g., phone) application, a cloud application, and a website.

As shown in FIG. 1, the selective performance system 100 includes a plurality of user systems 102A-102M, a network 104, a plurality of servers 106A-106N, a repository 108, and a store 110. Communication among the user systems 102A-102M and the servers 106A-106N is carried out over the network 104 using well-known network communication protocols. The network 104 may be a wide-area network (e.g., the Internet), a local area network (LAN), another type of network, or a combination thereof.

The user systems 102A-102M are processing systems that are capable of communicating with the servers 106A-106N. An example of a processing system is a system that includes at least one processor that is capable of manipulating data in accordance with a set of instructions. For instance, a processing system may be a computer, a personal digital assistant, etc. The user systems 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, the user systems 102A-102M are capable of accessing domains (e.g., Web sites) hosted by the servers 104A-104N, so that the user systems 102A-102M may access information that is available via the domains. Such domain may include Web pages, which may be provided as hypertext markup language (HTML) documents and objects (e.g., files) that are linked therein, for example.

The user systems 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

The servers 106A-106N are processing systems that are capable of communicating with the user systems 102A-102M. The servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, the servers 106A-106N are configured to host respective Web sites, so that the Web sites are accessible to users of the selective performance system 100.

One example type of a computer program that may be executed by one or more of the servers 106A-106N is a code development service. A code development service is a computer program that is capable of being used to develop an application (e.g., a software or firmware application). For instance, the code development service may be a tooling application. A tooling application is a computer program that is capable of being used to perform diagnostic operations (e.g., identifying source of problem, debugging, profiling, controlling, etc.) with respect to code. Examples of a tooling application include but are not limited to a web development program (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.).

The first server(s) 106A are shown to include selective performance logic 112 for illustrative purposes. The selective performance logic 112 is configured to use multi-factor and/or inherence-based authentication to selectively enable performance of the operation 120 with regard to the code 122 prior to or during release of the code 122. For example, the selective performance logic 112 may use multi-factor and/or inherence-based authentication to selectively enable performance of the operation 120 with regard to the code 122 in a build and release pipeline of the code 122. A build and release pipeline of code is a portion of a lifecycle of the code during which the code is built and released. Building code is a process during which source code files of the code are converted into one or more standalone software artifacts that are configured to be run on a computing device. Releasing code includes making the code available to one or more end users (e.g., in a pre-production or production environment). In another example, the selective performance logic 112 may use multi-factor and/or inherence-based authentication to selectively enable performance of the operation 120 with regard to the code 122 in a CI/CD pipeline of the code. The CI/CD pipeline may be a continuous integration/continuous delivery pipeline and/or a continuous integration/continuous deployment pipeline.

The selective performance logic 112 is configured to generate a factor request 116 based on (e.g., based at least in part on) receipt of an operation request 114 from a user system (e.g., first user system 102A) or initiation of the operation request 114 by the selective performance logic 112. The operation request 114 requests performance of the operation 120 with regard to the code 122 (e.g., on the code 122) prior to or during release of the code 122 to end users. The factor request 116 requests one or more authentication factors 118 from a user of the user system. Each of the authentication factor(s) 118 includes evidence that the user is who the user claims to be. The selective performance logic 112 is configured to compare the authentication factor(s) 118 to respective reference authentication factor(s) 124 to determine whether the user is who the user claims to be. The selective performance logic 112 may be further configured to review authorization information 216 to determine whether the user is authorized to perform the operation 120. If the selective performance logic 112 determines that the user is who the user claims to be and that the user is authorized to perform the operation 120, the selective performance logic 112 enables the operation 120 to be performed. If the selective performance logic 112 determines that the user is not who the user claims to be and/or that the user is not authorized to perform the operation 120, the selective performance logic 112 does not enable the operation 120 to be performed. It will be recognized that performance of multiple operations may be requested for each cycle in the lifecycle of the code 122. Example cycles in the lifecycle of the code 122 include but are not limited to development, build, test, release, and deployment. Performance of the operations for each cycle may be selectively enabled based on whether the users associated with the respective operations have been authenticated in accordance with one or more of the example techniques described herein.

In a multi-factor authentication example, the selective performance logic 112 generates a user-specific digital signature that identifies the user based on user-specific information that is included among the authentication factor(s) 118. The selective performance logic 112 selectively authenticates the user in accordance with a multi-factor authentication technique that requires multiple factors, which are included among the authentication factor(s) 118, to match reference authentication factors, which are included among the reference authentication factor(s) 124 and which identify a reference user who is authorized to perform the operation 120 with regard to the code 122, based on whether the user-specific digital signature that identifies the user matches a reference digital signature that identifies the reference user. The selective performance logic 112 selectively enables the performance of the operation 120 with regard to the code 122 based on whether the user is authenticated in accordance with the multi-factor authentication technique.

In an inherence-based authentication example, the selective performance logic 112 generates a user-specific digital signature that identifies the user based on inherence identifier(s) that are included among the authentication factor(s) 118. Each inherence identifier indicates something that the user is or does The selective performance logic 112 selectively enables the performance of the operation 120 with regard to the code 122 based on whether the user-specific digital signature that identifies the user matches a reference digital signature that identifies a reference user who is authorized to perform the operation 120 with regard to the code 122.

It will be recognized that the selective performance logic 112 may be a code development service, a tooling application, a web development program, and/or an integrated development environment.

The repository 108 stores information that is accessible to users of the code development service. For example, the repository 108 stores the code 122. In accordance with this example, the selective performance logic 112 may receive (e.g., collect or retrieve) the code 122 from the repository 108. The repository 108 may be any suitable type of repository. One type of repository is a database. For instance, the repository 108 may be a relational database, an entity-relationship database, an object database, an object relational database, an extensible markup language (XML) database, etc.

The store 110 stores information that is not accessible to users of the code development service. For example, the store 110 stores the reference authentication factor(s) 124 and the authorization information 126. In accordance with this example, the selective performance logic 112 may receive the reference authentication factor(s) 124 and the authorization information 126 from the store 110. The store 110 may be any suitable type of store, such as a database (e.g., a relational database, an entity-relationship database, an object database, an object relational database, or an XML database).

The repository 108 and the store 110 may be included in a common store. For example, the common store may be partitioned. In accordance with this example, a first partition of the common store may store the code 122. In an aspect of this example, and a second partition of the common store may store the reference authentication factor(s) 124 and the authorization information 126. In another aspect of this example, the second partition of the common store may store the reference authentication factor(s) 124, and a third partition of the common store may store the authorization information 126.

The selective performance logic 112 may be implemented in various ways to use multi-factor and/or inherence-based authentication to selectively enable performance of an operation prior to or during release of code, including being implemented in hardware, software, firmware, or any combination thereof. For example, selective performance logic 112 may be implemented as computer program code configured to be executed in one or more processors. In another example, selective performance logic 112 may be implemented as hardware logic/electrical circuitry. For instance, selective performance logic 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The selective performance logic 112 is shown to be incorporated in the first server(s) 106A for illustrative purposes and is not intended to be limiting. It will be recognized that the selective performance logic 112 (or any portion(s) thereof) may be incorporated in any one or more of the user systems 102A-102M. For example, client-side aspects of the selective performance logic 112 may be incorporated in one or more of the user systems 102A-102M, and server-side aspects of the selective performance logic 112 may be incorporated in the first server(s) 106A. For instance, each of one or more user systems may include a trusted platform module (TPM) to implement client-side aspects of the selective performance logic 112. In another example, the selective performance logic 112 may be incorporated in a single one of the user systems 102A-102M. In yet another example, the selective performance logic 112 (or any portion(s) thereof) may be distributed among the server(s) 106A-106N. In still another example, the selective performance logic 112 may be incorporated in a single one of the server(s) 106A-106N.

Figure 2:
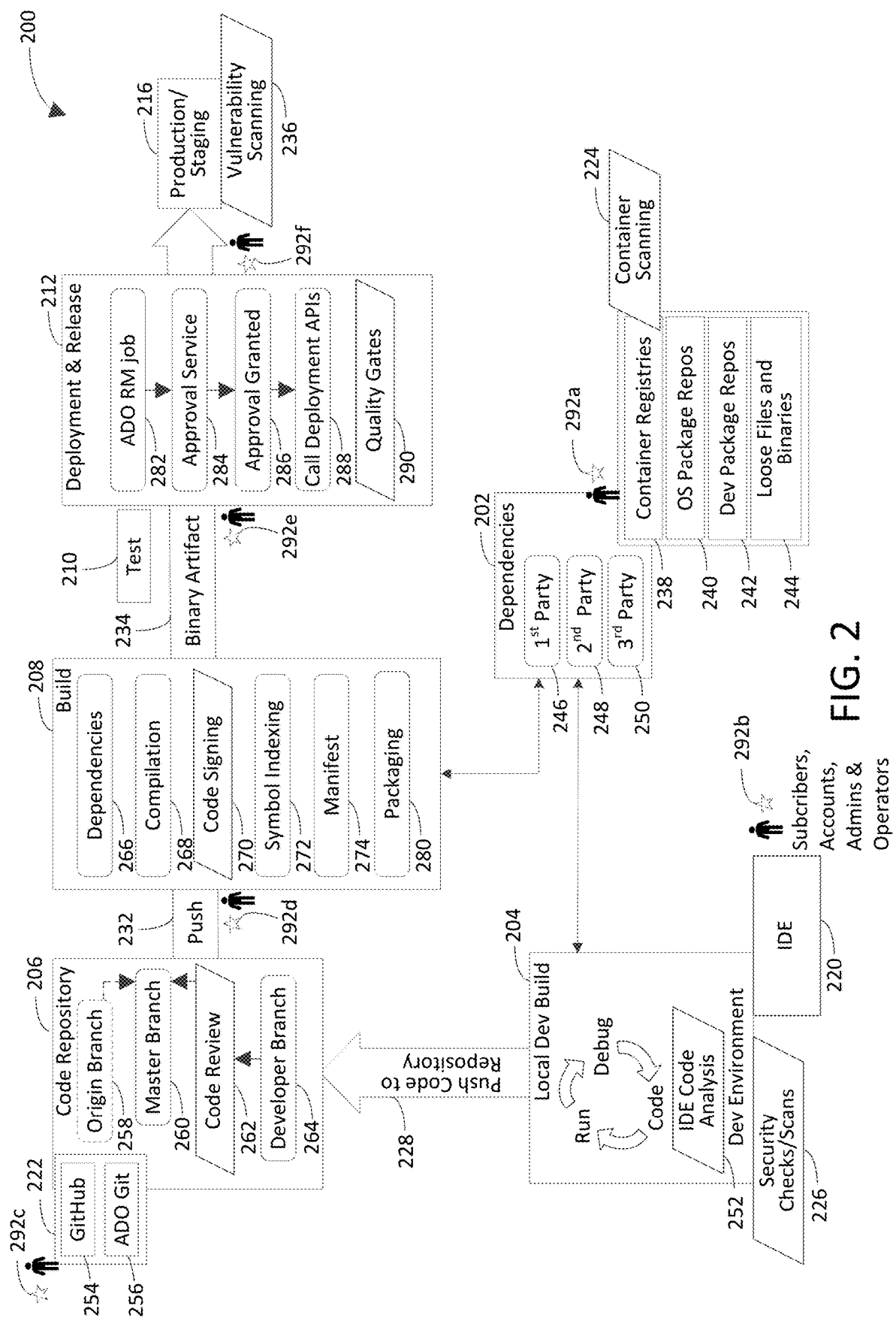
FIG. 2 is a block diagram of an example end-to-end representation of a lifecycle of code in accordance with an embodiment.

FIG. 2 is a block diagram of an example end-to-end representation of a lifecycle 200 of code (e.g., code 122 of FIG. 1) in accordance with an embodiment. As shown in FIG. 2, dependencies 202 are code portions on which the code that is developed by a developer depends. The dependencies 202 may be stored or included in container registries 238, operating system (OS) package repositories 240, development package repositories 242, and loose files and binaries 244. Container scanning 224 may be performed with regard to the container registries 238. The dependencies 202 may include first-party dependencies 246, second-party dependencies 248, and third-party dependencies 250. First-party dependencies 246 are dependencies that are created by the developer. Second-party dependencies 248 are dependencies are dependencies that are created by someone within the same organization as the developer but who is not in a same group as the developer within the organization. Third-party-dependencies are dependencies that are created by someone external to the developer's organization.

The dependencies 202 are incorporated into a local dev build 204. In the local dev build 204, code is developed, run, and debugged in an iterative cycle using an integrated development environment (IDE) 220 to perform IDE code analysis 252. Security checks (a.k.a. scans) 226 are performed on the code. The code is pushed to a code repository 206, as illustrated by arrow 228.

The code repository 206 stores a master branch 260 of code. The master branch 260 includes a developer branch 264 and potentially an origin branch 258. The developer branch 264 is the code that was pushed from the local dev build 204 to the code repository 206. The origin branch 258 is code that is stored in the code repository 206 and that is not included in the developer branch 264. It will be recognized that the origin branch 258 need not necessarily exist. If the origin branch 258 exists, the origin branch 258 is combined with the developer branch 264 to provide the master branch 260. If the origin branch 258 does not exist, the master branch 260 may include only the developer branch 264. A code review 262 is performed on the developer branch 264 before the developer branch 264 is incorporated into the master branch 260. Hosting services 222 are shown in FIG. 2 to include GitHub 254 and ADO Git 256 for non-limiting, illustrative purposes. The GitHub® hosting service is developed and distributed by GitHub, Inc. The ADO Git™ hosting service is developed by Microsoft Corporation. The hosting services 222 are configured to perform authentication (e.g., multi-factor authentication (MFA) and/or inherence-based authentication) on the developer branch 264.

The master branch 260 is pushed from the code repository 206 to a build cycle 208, as illustrated by element 232. In the build cycle 208, dependencies 266 are received. The dependencies 266 are incorporated into the master branch 260. The dependencies 266 may include first-party, second-party, and/or third-party dependencies. The master branch 260 is signed in accordance with a code signing 270 technique to indicate that the master branch is trustworthy. For instance, signing the master branch 260 may indicate that no malicious entities have tampered with the master branch 260. Signing the master branch 260 may enable artifacts that are not signed to be blocked from processing (e.g., compilation). Symbols of the master branch 260 are indexed in accordance with a symbol indexing 272 technique. A manifest 274 is generated to include the build and associated artifacts. The master branch 260 is compiled in accordance with a compilation 268 technique and packaged in accordance with a packaging 280 technique.

Binary artifacts 234 of the compiled version of the master branch 260 are tested in accordance with a test 210 technique to determine whether the binary artifacts 234 satisfy one or more criteria. If the binary artifacts 234 satisfy the one or more criteria, the binary artifacts 234 continue to a deployment and release 212 cycle. In the deployment and release 212 cycle, an ADO RM job 282 and an approval service 284 are performed on the compiled master branch. Once approval of the compiled master branch is granted 286, deployment application programming interfaces (APIs) are called 288 to deploy the binary artifacts 234. Quality gates 290 are applied to the binary artifacts 234 to determine whether the binary artifacts 234 satisfy one or more additional criteria. For instance, the quality gates 290 may mitigate (e.g., prevent) quality regression prior to or during a release of the binary artifacts 234. If the binary artifacts 234 satisfy the one or more additional criteria, the binary artifacts 234 are released to end users. If the binary artifacts 234 do not satisfy the one or more additional criteria, the binary artifacts 234 are not released to the end users.

Upon release of the binary artifacts 234, production and staging 216 (e.g., publishing) of the binary artifacts 234 is performed. For instance, vulnerability scanning 236 may be performed on the binary artifacts 234 to determine how secure the binary artifacts 234 are. If it is determined that the binary artifacts 234 are vulnerable to malicious attacks (e.g., security of the binary artifacts 234 is less than a security threshold), the binary artifacts 234 may be modified to increase their security. The binary artifacts 234 may not be published to the end users until the binary artifacts 234 are modified to increase their security.

Example techniques described herein may be performed at any of a variety of points (e.g., any of points 292a-292f) in the lifecycle 200 of the code. For instance, the points 292a-292f may correspond to respective operations that are to be performed with regard to the code. At point 292a, the dependencies 202 are generated, signed, and/or checked-in. The signing and/or checking-in of the dependencies 202 may be selectively performed based on multi-factor and/or inherence-based authentication of the entity that is attempting to sign and/or check-in the dependencies 202 in accordance with one or more of the example techniques described herein. At point 292b, code (a.k.a. developer branch 264) is generated using the IDE 220, signed, and/or checked-in. The signing and/or checking-in of the developer branch 264 may be selectively performed based on multi-factor and/or inherence-based authentication of the developer of the developer branch 264 in accordance with one or more of the example techniques described herein. At point 292c, the developer branch 264 is reviewed. The review of the developer branch 264 may be selectively performed based on multi-factor and/or inherence-based authentication of a reviewer who is attempting to review the developer branch 264 in accordance with one or more of the example techniques described herein. At point 292d, a program that includes the master branch 260 is built. The building of the code may be selectively performed based on multi-factor and/or inherence-based authentication of a user who is attempting to build the code in accordance with one or more of the example techniques described herein. At point 292e, the binary artifacts 234 are deployed. The deployment of the binary artifacts 234 may be selectively performed based on multi-factor and/or inherence-based authentication of a user who is attempting to deploy the binary artifacts 234 in accordance with one or more of the example techniques described herein. At point 292f, the binary artifacts 234 are released and/or published to end users. The release and/or publication of the binary artifacts 234 may be selectively performed based on multi-factor and/or inherence-based authentication of a user who is attempting to release and/or publish the binary artifacts 234 in accordance with one or more of the example techniques described herein.

Figure 3:
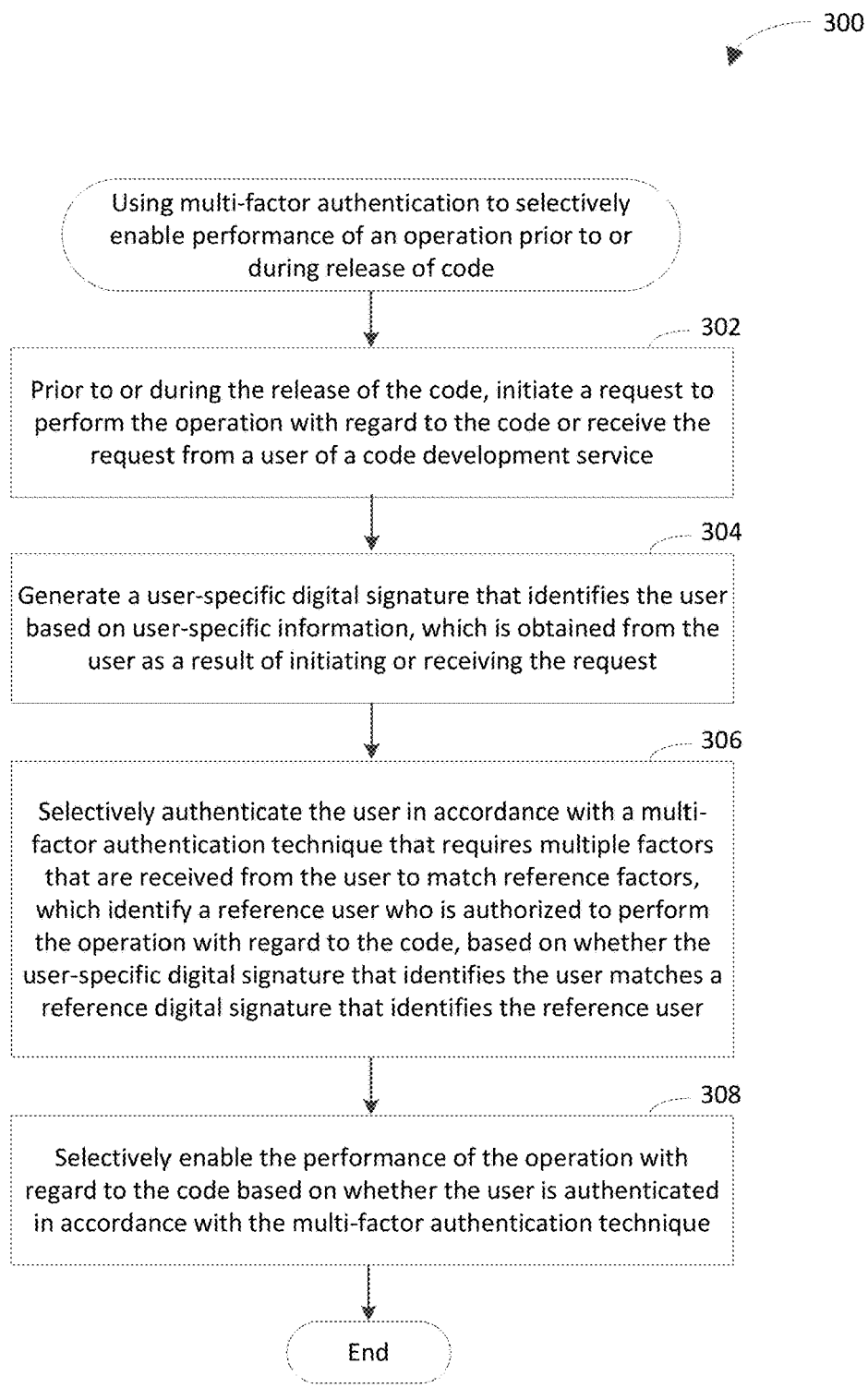
FIG. 3 depicts a flowchart of an example method for using multi-factor authentication to selectively enable performance of an operation prior to or during release of code in accordance with an embodiment.
Figure 4:
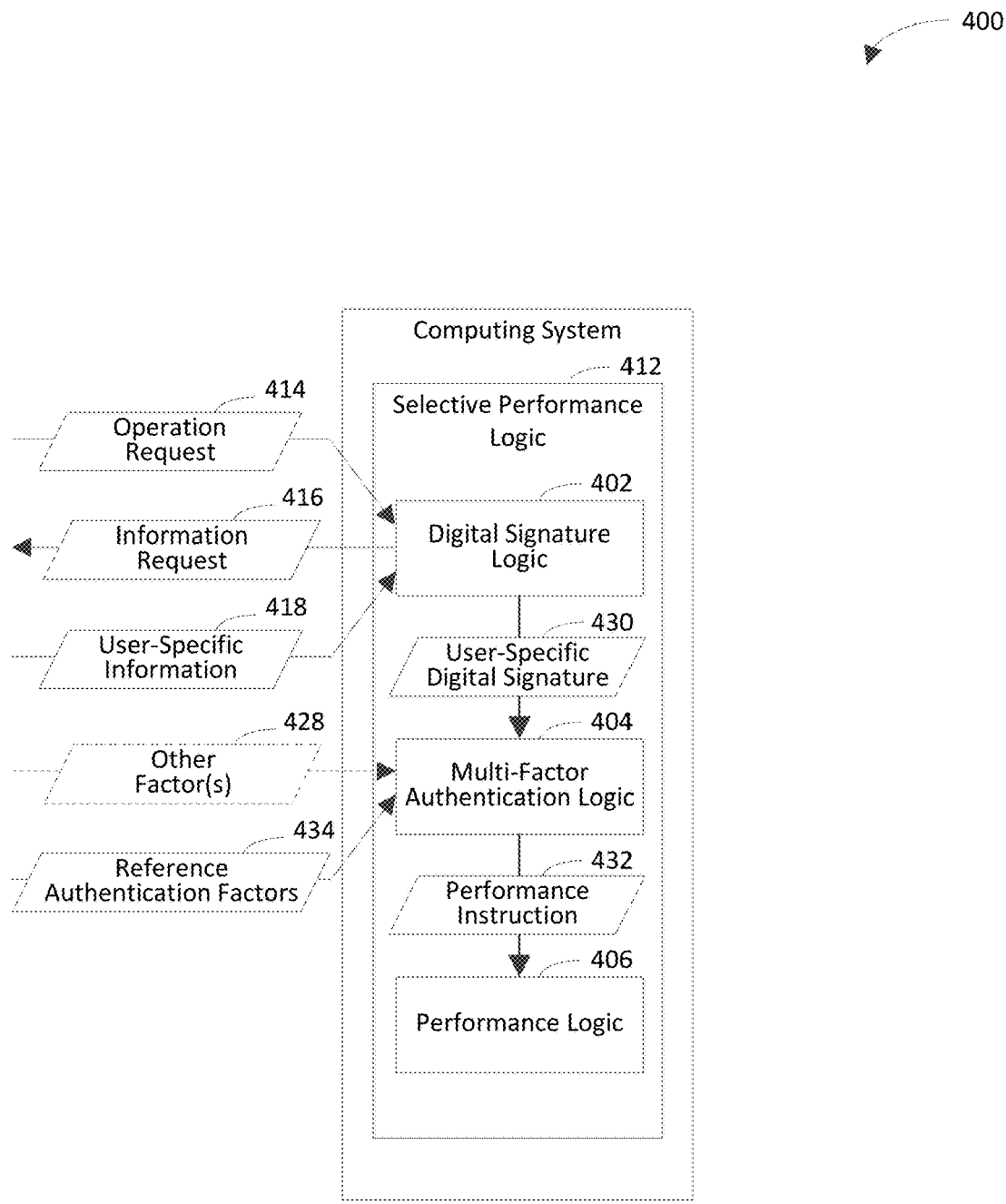
FIGS. 4 and 6 are block diagrams computing systems that include example implementations of selective performance logic shown in FIG. 1 in accordance with embodiments.

FIG. 3 depicts a flowchart 300 of an example method for using multi-factor authentication to selectively enable performance of an operation prior to or during release of code in accordance with an embodiment. Flowchart 300 may be performed by any one or more of the user systems 102A-102M and/or any one or more of the servers 106A-106N shown in FIG. 1, for example. For illustrative purposes, flowchart 300 is described with respect to a computing system 400 shown in FIG. 4. The computing system 400 includes selective performance logic 412, which is an example implementation of the selective performance logic 112 shown in FIG. 1. The selective performance logic 412 includes digital signature logic 402, multi-factor authentication logic 404, and performance logic 406. Further structural and operational embodiments will be apparent to persons skilled in the relevant art(s) based on the discussion regarding flowchart 300.

As shown in FIG. 3, the method of flowchart 300 begins at step 302. In step 302, prior to or during the release of the code, a request to perform the operation with regard to the code is initiated or the request is received from a user of a code development service. The code includes software code and/or firmware code. The user may be a developer, reviewer, builder, signor, releaser, publisher, or deployer of the code, or an administrator of the code development service. The operation may include checking-in the code to a repository associated with the code development service, performing a review of the code, performing a build of the code, signing the code, releasing the code to end users, publishing the code to the end users, or deploying the code. In an example implementation, prior to or during the release of the code, the digital signature logic 402 initiates an operation request 414 to perform the operation with regard to the code or receives the operation request 414 from the user of the code development service.

At step 304, a user-specific digital signature that identifies (e.g., uniquely identifies) the user is generated based on user-specific information, which is obtained from the user as a result of initiating or receiving the request. For instance, the user-specific information may be obtained from an inherence factor and/or an ownership factor associated with the user. Accordingly, the user-specific information may be obtained from an item that is in possession of the user. For example, the user-specific information may include an employee identifier of the user. In accordance with this example, the employee identifier distinguishes the user from other employees of an organization. In further accordance with this example, the employee identifier may include an employee number of the user and/or a name of the user. In an example implementation, the digital signature logic 402 generates a user-specific digital signature 430 that identifies the user based on user-specific information 418, which is obtained from the user as a result of initiating or receiving the operation request 414. For example, the digital signature logic 402 may generate an information request 416 based on initiating or receiving the operation request 414. The information request 416 requests the user-specific information 418. The user-specific information 418 includes one or more authentication factors associated with the user. In accordance with this example, the digital signature logic 402 may generate the user-specific digital signature 430 based on the one or more factors. In further accordance with this example, the digital signature logic 402 may generate the user-specific digital signature 430 further based on one or more additional factors. For instance, the digital signature logic 402 may obtain the one or more additional factors prior to receipt of the operation request 414.

At step 306, the user is selectively authenticated in accordance with a multi-factor authentication technique that requires multiple factors that are received from the user to match reference factors, which identify a reference user who is authorized to perform the operation with regard to the code, based on whether the user-specific digital signature that identifies the user matches a reference digital signature that identifies the reference user. For instance, the multi-factor authentication technique may require the multiple factors that are received from the user and the reference factors to be same.

In an example implementation, the multi-factor authentication logic 404 selectively authenticates the user in accordance with the multi-factor authentication technique that requires multiple factors that are received from the user to match reference authentication factors 434, which identify the reference user, based on whether the user-specific digital signature 430 matches the reference digital signature, which is included among the reference authentication factors 434. For instance, the multi-factor authentication logic 404 may selectively authenticate the user in accordance with the multi-factor authentication technique further based on whether other factor(s) 428 match respective reference authentication factor(s) that are included among the reference authentication factors 434. If the multiple factors that are received from the user match the reference authentication factors 434, the multi-factor authentication logic 404 authenticates the user. If the multiple factors that are received from the user do not match the reference authentication factors 434, the multi-factor authentication logic 404 does not authenticate the user.

In accordance with this implementation, the multi-factor authentication logic 404 may generate a performance instruction 432, which indicates whether the operation is to be performed with regard to the code based on whether the user is authenticated. In a first example, the multi-factor authentication logic 404 may be configured to generate the performance instruction 432 to have a first value based on the user being authenticated and may be further configured to generate the performance instruction 432 to have a second value that is different from the first value based on the user not being authenticated. In a second example, the multi-factor authentication logic 404 may be configured to generate the performance instruction 432 based on the user being authenticated and may be further configured to not generate the performance instruction 432 based on the user not being authenticated.

In an example embodiment, selectively authenticating the user at step 306 is based on whether a device identifier of a computing device from which the request is received matches a reference device identifier. For example, the reference device identifier may be associated with a computing device of the user. In accordance with this example, the device identifier may be a serial number of the computing device of the user. For instance, the serial number of the computing device may have been assigned by a manufacturer of the computing device (e.g., at the time of manufacture of the computing device).

At step 308, the performance of the operation with regard to the code is selectively enabled (e.g., selectively triggered) based on whether the user is authenticated in accordance with the multi-factor authentication technique. The performance of the operation may include initiation of the operation and/or completion of the operation. In an example implementation, the performance logic 406 selectively enables the performance of the operation with regard to the code based on whether the user is authenticated in accordance with the multi-factor authentication technique. In accordance with the first example mentioned above with regard to step 306, the performance logic 406 may be configured to enable the performance of the operation with regard to the code based on the performance instruction 432 having the first value and may be further configured to not enable the performance of the operation with regard to the code based on the performance instruction 432 having the second value. In accordance with the second example mentioned above with regard to step 306, the performance logic 406 may be configured to enable the performance of the operation with regard to the code based on the performance instruction 432 being received by the performance logic 406 and may be further configured to not enable the performance of the operation with regard to the code based on the performance instruction 432 not being received by the performance logic 406.

In an example embodiment, generating the user-specific digital signature at step 304 includes generating a hash that is based on the user-specific information. In accordance with this embodiment, selectively authenticating the user at step 306 is performed based on whether the hash matches a reference hash associated with the reference user.

In another example embodiment, selectively authenticating the user at step 306 is performed based on whether inherence factor(s), which identify the user and which were captured during an attempt of the user to log into a computing device, an application, or a service, match respective reference inherence factor(s) that identify the reference user. In an aspect of this embodiment, generating the user-specific digital signature at step 304 includes generating a hash that is based on the user-specific information and that is further based on the inherence factor(s), which identify the user and which were captured during the attempt of the user to log into the computing device, the application, or the service. In accordance with this aspect, selectively authenticating the user at step 306 is based on whether the hash matches a reference hash associated with the reference user.

In yet another example embodiment, a first subset of users is authorized to perform the operation in a first environment. In an example, the first subset of the users is not authorized to perform the operation in a second environment. In another example, the first subset of the users is authorized to perform the operation in the first environment and the second environment. In accordance with this embodiment, a second subset of the users is authorized to perform the operation in the second environment and is not authorized to perform the operation in the first environment. In further accordance with this embodiment, initiating or receiving the request at step 302 includes initiating or receiving the request to perform the operation with regard to the code in the first environment. In further accordance with this embodiment, selectively authenticating the user at step 306 includes authenticating the user in accordance with the multi-factor authentication technique based on the user-specific digital signature that identifies the user matching a reference digital signature that identifies the reference user who is included in the first subset. In further accordance with this embodiment, selectively enabling the performance of the operation with regard to the code at step 308 includes enabling the performance of the operation with regard to the code in the first environment based on the user being authenticated in accordance with the multi-factor authentication technique.

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, the method of flowchart 300 includes signing the code with the user-specific digital signature.

In another example embodiment, the method of flowchart 300 further includes generating a record in a blockchain to memorialize the performance of the operation with regard to the code. A blockchain is a list of records (a.k.a. blocks) that are linked cryptographically. A record is added to the list based on each occurrence of a triggering event (e.g., performance of an operation with regard to the code). Each record includes a cryptographic hash of the record that was most recently added to the list prior to the respective record that includes the cryptographic hash, a timestamp associated with the record (e.g., corresponding to and/or indicating a time at which the record is added to the list), and potentially other information. For example, the other information may include a Merkle tree. A Merkle tree is a tree in which each leaf node is identified (e.g., labelled) with a cryptographic hash of a corresponding record and each non-leaf node is identified with a cryptographic hash of the identifiers (e.g., labels) of its child nodes. For instance, performance logic 406 may generate the record in the blockchain to memorialize the performance of the operation with regard to the code.

It will be recognized that the selective performance logic 412 may not include one or more of the digital signature logic 402, the multi-factor authentication logic 404, and/or the performance logic 406. Furthermore, the selective performance logic 412 may include components in addition to or in lieu of the digital signature logic 402, the multi-factor authentication logic 404, and/or the performance logic 406.

Figure 5:
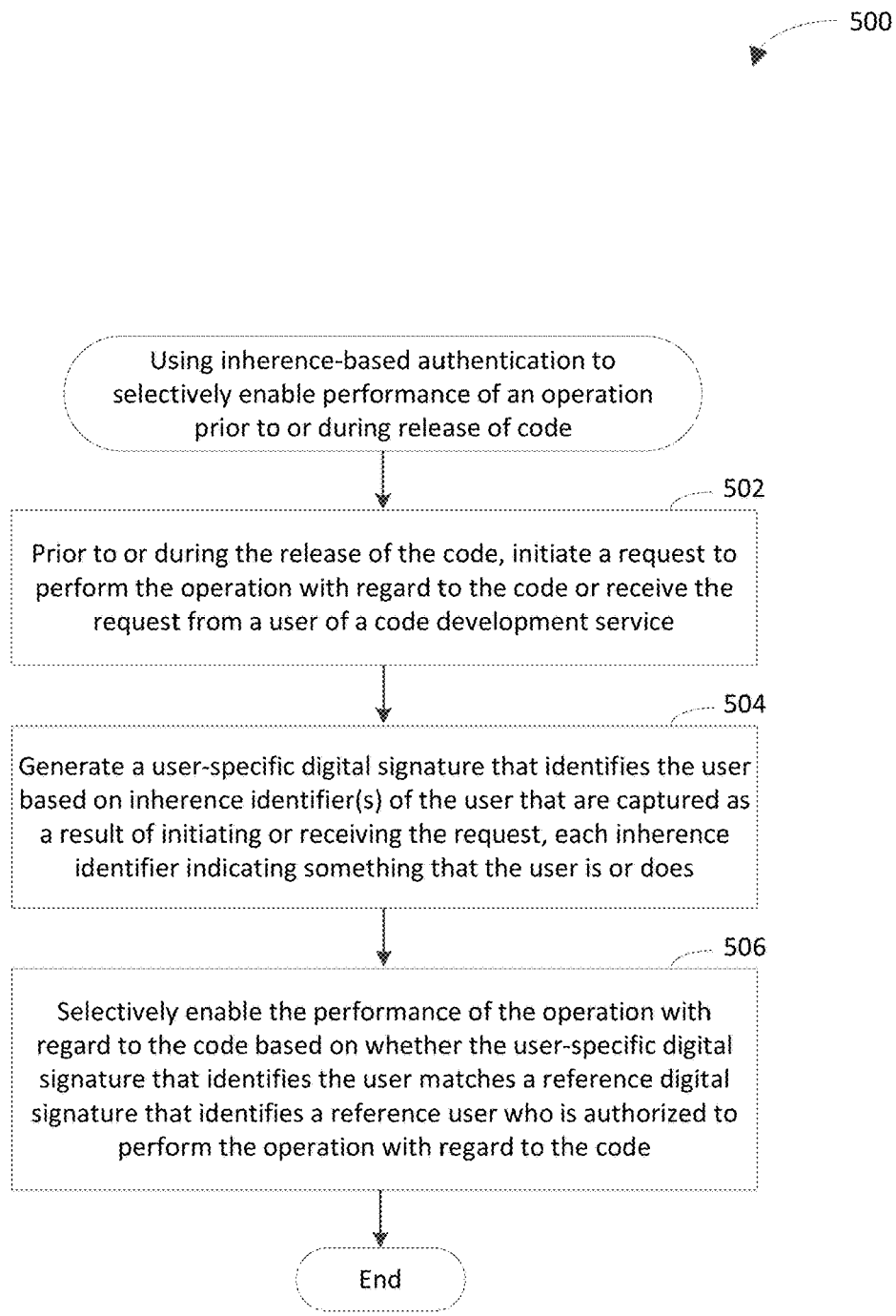
FIG. 5 depicts a flowchart of an example method for using inherence-based authentication to selectively enable performance of an operation prior to or during release of code in accordance with an embodiment.
Figure 6:
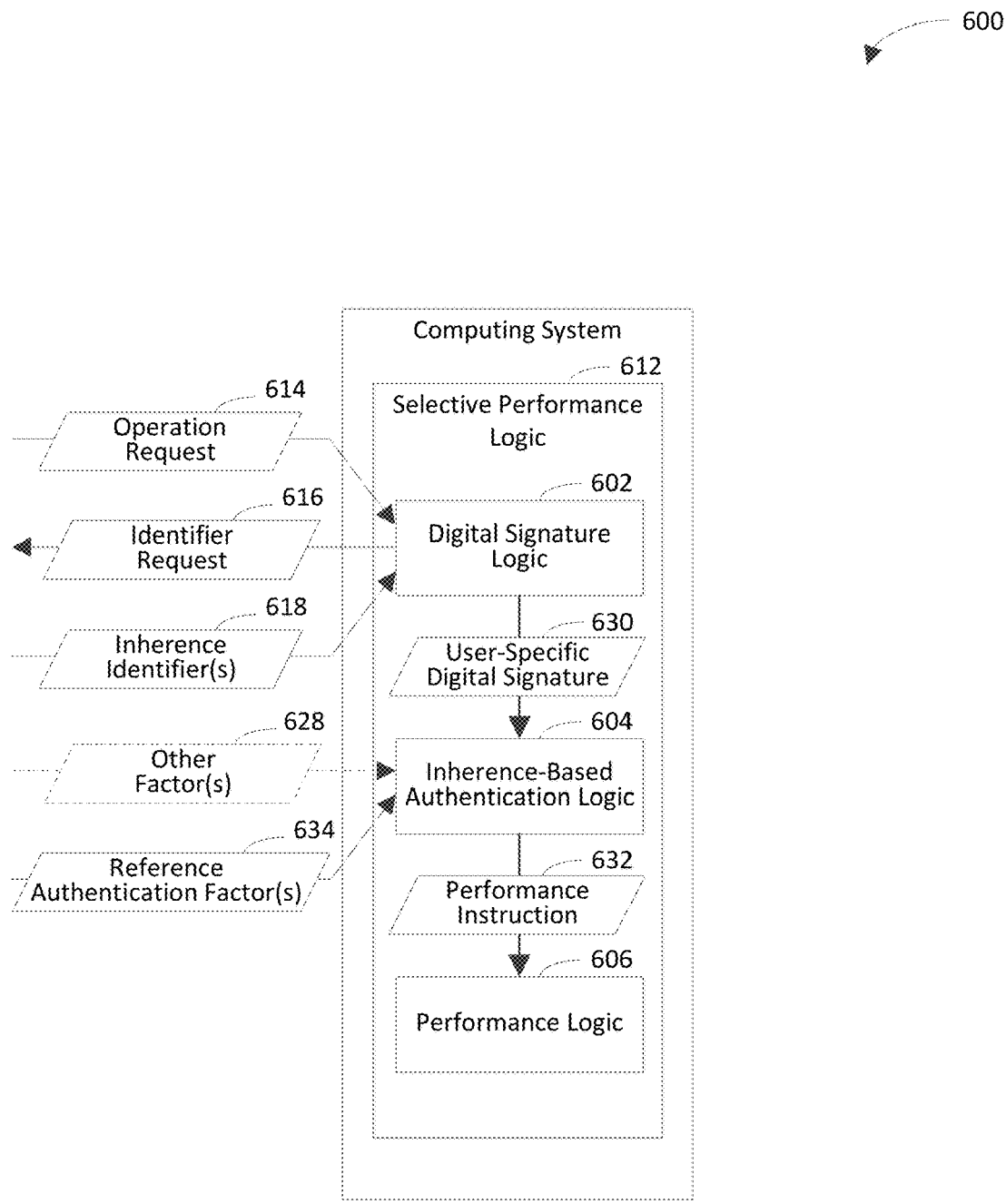

FIG. 5 depicts a flowchart 300 of an example method for using inherence-based authentication to selectively enable performance of an operation prior to or during release of code in accordance with an embodiment. Flowchart 500 may be performed by any one or more of the user systems 102A-102M and/or any one or more of the servers 106A-106N shown in FIG. 1, for example. For illustrative purposes, flowchart 500 is described with respect to a computing system 600 shown in FIG. 6. The computing system 600 includes selective performance logic 612, which is an example implementation of the selective performance logic 112 shown in FIG. 1. The selective performance logic 612 includes digital signature logic 602, inherence-based authentication logic 604, and performance logic 606. Further structural and operational embodiments will be apparent to persons skilled in the relevant art(s) based on the discussion regarding flowchart 500.

As shown in FIG. 5, the method of flowchart 500 begins at step 502. In step 502, prior to or during the release of the code, a request to perform the operation with regard to the code is initiated or the request is received from a user of a code development service. The code includes software code and/or firmware code. The user may be a developer, reviewer, builder, signor, releaser, publisher, or deployer of the code, or an administrator of the code development service. The operation may include checking-in the code to a repository associated with the code development service, performing a review of the code, performing a build of the code, signing the code, releasing the code to end users, publishing the code to the end users, or deploying the code.

In an example implementation, prior to or during the release of the code, the digital signature logic 602 initiates an operation request 614 to perform the operation with regard to the code or receives the operation request 614 from the user of the code development service.

At step 504, a user-specific digital signature that identifies the user is generated based at least in part on inherence identifier(s) of the user that are captured as a result of initiating or receiving the request. Each inherence identifier indicates something that the user is or does. For instance, each inherence identifier may be a biometric identifier or a behaviometric identifier. Each biometric identifier may represent (e.g., describe) a face, hand, palm veins, palmprint, fingerprint, DNA, iris, or retina of the user. Each behaviometric identifier may represent (e.g., describe) a voice, gait, or typing rhythm of the user. In an example implementation, the digital signature logic 602 generates a user-specific digital signature 630 that identifies the user based on inherence identifier(s) 618 of the user that are captured as a result of initiating or receiving the operation request 614. For example, the digital signature logic 602 may generate an identifier request 616 based on initiating or receiving the operation request 614. The identifier request 616 requests the inherence identifier(s) 618. In accordance with this implementation, the digital signature logic 602 may generate the user-specific digital signature 630 based on the inherence identifier(s) 618 and further based on one or more additional factors. For instance, the digital signature logic 602 may obtain the one or more additional factors prior to receipt of the operation request 614.

At step 506, the performance of the operation with regard to the code is selectively enabled (e.g., selectively triggered) based on whether the user-specific digital signature that identifies the user matches a reference digital signature that identifies a reference user who is authorized to perform the operation with regard to the code. The performance of the operation may include initiation of the operation and/or completion of the operation. In an example implementation, the performance logic 606 selectively enables the performance of the operation with regard to the code based on whether the user-specific digital signature 630 that identifies the user matches the reference digital signature, which is included among the reference authentication factor(s) 634. In an aspect of this implementation, the inherence-based authentication logic 604 selectively authenticates the user based on whether the user-specific digital signature 630 matches the reference digital signature. For instance, the inherence-based authentication logic 604 may selectively authenticate the user further based on whether other factor(s) 628 match respective reference authentication factor(s) that are included among the reference authentication factor(s) 634. Accordingly, criteria for inherence-based authentication require the user-specific digital signature 630 to match the reference digital signature and may further require the other factor(s) 628 to match the respective reference authentication factor(s) that are included among the reference authentication factor(s) 634. If the criteria for inherence-based authentication are satisfied, the inherence-based authentication logic 604 authenticates the user. If the criteria for inherence-based authentication are not satisfied, the inherence-based authentication logic 604 does not authenticate the user.

In accordance with this aspect, the inherence-based authentication logic 604 may generate a performance instruction 632, which indicates whether the operation is to be performed with regard to the code based on whether the user is authenticated. In a first example, the inherence-based authentication logic 604 may be configured to generate the performance instruction 632 to have a first value based on the user being authenticated and may be further configured to generate the performance instruction 632 to have a second value that is different from the first value based on the user not being authenticated. In a second example, the inherence-based authentication logic 604 may be configured to generate the performance instruction 632 based on the user being authenticated and may be further configured to not generate the performance instruction 632 based on the user not being authenticated.

In an example implementation, the performance logic 606 selectively enables the performance of the operation with regard to the code based on whether the user is authenticated. In accordance with the first example mentioned above, the performance logic 606 may be configured to enable the performance of the operation with regard to the code based on the performance instruction 632 having the first value and may be further configured to not enable the performance of the operation with regard to the code based on the performance instruction 632 having the second value. In accordance with the second example mentioned above, the performance logic 606 may be configured to enable the performance of the operation with regard to the code based on the performance instruction 632 being received by the performance logic 606 and may be further configured to not enable the performance of the operation with regard to the code based on the performance instruction 632 not being received by the performance logic 606.

In an example embodiment, generating the user-specific digital signature at step 504 includes generating a hash that is based on the inherence identifier(s) of the user that are captured a result of initiating or receiving the request. In accordance with this embodiment, selectively enabling the performance of the operation with regard to the code at step 506 is based on whether the hash matches a reference hash associated with the reference user.

In another example embodiment, a first subset of users is authorized to perform the operation in a first environment. In an example, the first subset of the users is not authorized to perform the operation in a second environment. In another example, the first subset of the users is authorized to perform the operation in the first environment and the second environment. In accordance with this embodiment, a second subset of the users is authorized to perform the operation in the second environment and is not authorized to perform the operation in the first environment. In further accordance with this embodiment, initiating or receiving the request at step 502 includes initiating or receiving the request to perform the operation with regard to the code in the first environment. In further accordance with this embodiment, selectively enabling the performance of the operation at step 506 includes enabling the performance of the operation with regard to the code in the first environment based on the user-specific digital signature that identifies the user matching the reference digital signature that identifies the reference user who is included in the first subset.

In yet another example embodiment, selectively enabling the performance of the operation with regard to the code at step 506 is performed based on whether the user satisfies multiple factors of a multi-factor authentication technique. In accordance with this embodiment, the multi-factor authentication technique includes a first factor that requires the user-specific digital signature that identifies the user to match the reference digital signature that identifies the reference user who is authorized to perform the operation with regard to the code.

In an aspect of this embodiment, the multi-factor authentication technique includes an ownership factor associated with the user in addition to inherence factor(s) that are indicated by the inherence identifier(s) of the user that are captured as a result of initiating or receiving the request. For example, the ownership factor may require information stored in an item that is in possession of the user to match reference information associated with the user. In accordance with this example, the item may include (e.g., be) a smartcard, wrist band, ID card, security token, device implanted under the user's skin, software token, cell phone (having a built-in hardware token or storing a software token), and/or hardware authentication device (e.g., YubiKey®). In further accordance with this example, the reference information may include an employee identifier (e.g., employee number and/or name) of the user.

In another aspect of this embodiment, the multi-factor authentication technique includes a second factor that requires second inherence identifier(s), which identify the user and which were captured during an attempt of the user to log into a computing device, an application, or a service, to match respective reference inherence identifier(s) that identify the reference user. For example, generating the user-specific digital signature at step 504 may include generating a hash that is based on the inherence identifier(s), which identify the user and which are captured a result of initiating or receiving the request, and that is further based on the second inherence identifier(s) of the user, which were captured during the attempt of the user to log into the computing device, the application, or the service. In accordance with this example, selectively enabling the performance of the operation with regard to the code at step 506 may be performed based on whether the hash matches a reference hash associated with the reference user.

In yet another aspect of this embodiment, the multi-factor authentication technique includes a second factor that requires a device identifier of a computing device of the user from which the request is received to match a reference device identifier.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the method of flowchart 500 includes signing the code with the user-specific digital signature.

In another example embodiment, the method of flowchart 500 further includes generating a record in a blockchain to memorialize the performance of the operation with regard to the code. For instance, performance logic 606 may generate the record in the blockchain to memorialize the performance of the operation with regard to the code.

It will be recognized that the selective performance logic 612 may not include one or more of the digital signature logic 602, the inherence-based authentication logic 604, and/or the performance logic 606. Furthermore, the selective performance logic 612 may include components in addition to or in lieu of the digital signature logic 602, the inherence-based authentication logic 604, and/or the performance logic 606.

Figure 7:
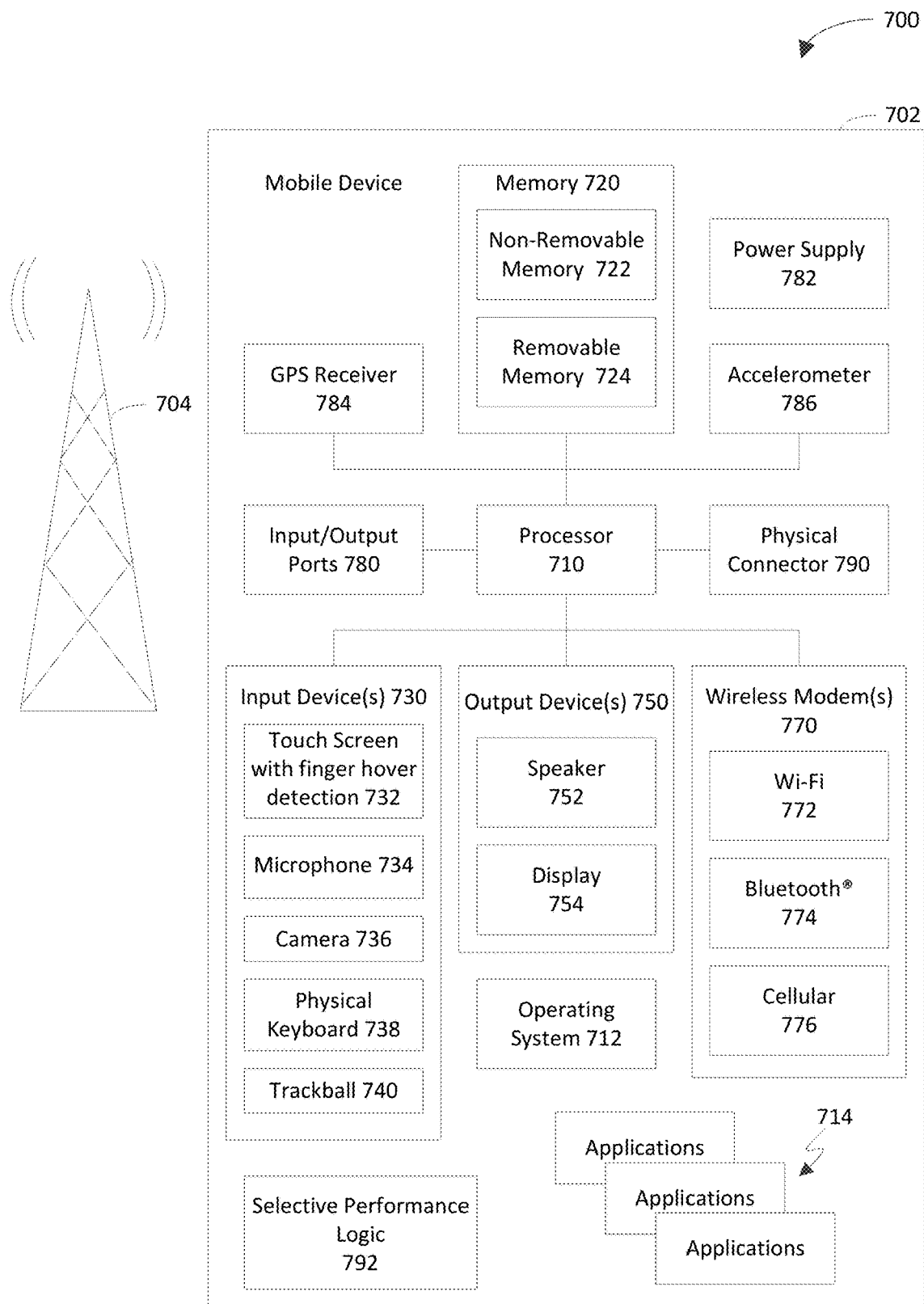
FIG. 7 is a system diagram of an exemplary mobile device in accordance with an embodiment.

FIG. 7 is a system diagram of an exemplary mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.)

and may allow wireless two-way communications with one or more mobile communications networks 704, such as a cellular or satellite network, or with a local area or wide area network.

The mobile device 700 may include a processor 710 (e.g., signal processor, microprocessor, ASIC, or other control and processing logic circuitry) for performing such tasks as signal coding, data processing, input/output processing, power control, and/or other functions. An operating system 712 may control the allocation and usage of the components 702 and support for one or more applications 714 (a.k.a. application programs). The applications 714 may include common mobile computing applications (e.g., email applications, calendars, contact managers, web browsers, messaging applications) and any other computing applications (e.g., word processing applications, mapping applications, media player applications).

The mobile device 700 may include memory 720. The memory 720 may include non-removable memory 722 and/or removable memory 724. The non-removable memory 722 may include RAM, ROM, flash memory, a hard disk, or other well-known memory storage technologies. The removable memory 724 may include flash memory or a Subscriber Identity Module (SIM) card, which is well known in GSM communication systems, or other well-known memory storage technologies, such as "smart cards." The memory 720 may store data and/or code for running the operating system 712 and the applications 714. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 700 may include selective performance logic 792. The selective performance logic 792 is configured to use multi-factor and/or inherence-based authentication to selectively enable performance of an operation prior to or during release of software and/or firmware code in accordance with any one or more of the techniques described herein.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 770 may be coupled to antenna(s) (not shown) and may support two-way communications between the processor 710 and external devices, as is well understood in the art. The modem(s) 770 are shown generically and may include a cellular modem 776 for communicating with the mobile communication network 704 and/or other radio-based modems (e.g., Bluetooth® 774 and/or Wi-Fi 772). At least one of the wireless modem(s) 770 is typically configured for communication with one or more cellular networks, such as a GSM network for data and voice communications within a single cellular network, between cellular networks, or between the mobile device and a public switched telephone network (PSTN).

The mobile device may further include at least one input/output port 780, a power supply 782, a satellite navigation system receiver 784, such as a Global Positioning System (GPS) receiver, an accelerometer 786, and/or a physical connector 790, which may be a USB port, IEEE 1394 (FireWire) port, and/or RS-232 port. The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the selective performance logic 112, the digital signature logic 402, the multi-factor authentication logic 404, the performance logic 406, the selective performance logic 412, the digital signature logic 602, the inherence-based authentication logic 604, the performance logic 606, the selective performance logic 612, flowchart 300, and/or flowchart 500 may be implemented in hardware, software, firmware, or any combination thereof.

For example, any one or more of the selective performance logic 112, the digital signature logic 402, the multi-factor authentication logic 404, the performance logic 406, the selective performance logic 412, the digital signature logic 602, the inherence-based authentication logic 604, the performance logic 606, the selective performance logic 612, flowchart 300, and/or flowchart 500 may be implemented, at least in part, as computer program code configured to be executed in one or more processors.

In another example, any one or more of the selective performance logic 112, the digital signature logic 402, the multi-factor authentication logic 404, the performance logic 406, the selective performance logic 412, the digital signature logic 602, the inherence-based authentication logic 604, the performance logic 606, the selective performance logic 612, flowchart 300, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to use multi-factor authentication to selectively enable performance of an operation prior to or during release of code comprises a memory and one or more processors coupled to the memory. The one or more processors are configured to generate a user-specific digital signature that identifies a user of a code development service based at least in part on user-specific information, which is obtained from the user as a result of initiating a request to perform the operation with regard to the code prior to or during the release of the code or receiving the request from the user prior to or during the release of the code. The code includes at least one of software code or firmware code. The one or more processors are further configured to selectively authenticate the user in accordance with a multi-factor authentication technique that requires a plurality of factors that are received from the user to match a plurality of reference factors, which identify a reference user who is authorized to perform the operation with regard to the code, based at least in part on whether the user-specific digital signature that identifies the user matches a reference digital signature that identifies the reference user. The one or more processors are further configured to selectively enable the performance of the operation with regard to the code based at least in part on whether the user is authenticated in accordance with the multi-factor authentication technique.

In a first aspect of the first example system, the one or more processors are configured to generate the user-specific digital signature by generating a hash that is based at least in part on the user-specific information. In accordance with the first aspect, the one or more processors are configured to selectively authenticate the user in accordance with the multi-factor authentication technique based at least in part on whether the hash matches a reference hash associated with the reference user.

In a second aspect of the first example system, the one or more processors are further configured to sign the code with the user-specific digital signature. The second aspect of the first example system may be implemented in combination with the first aspect of the first example system, though the example embodiments are not limited in this respect.

In a third aspect of the first example system, the user-specific information is obtained from an item that is in possession of the user as a result of initiating or receiving the request. The third aspect of the first example system may be implemented in combination with the first and/or second aspect of the first example system, though the example embodiments are not limited in this respect.

In a fourth aspect of the first example system, the one or more processors are configured to selectively authenticate the user in accordance with the multi-factor authentication technique based at least in part on whether one or more inherence factors, which identify the user and which were captured during an attempt of the user to log into a computing device, an application, or a service, match one or more respective reference inherence factors that identify the reference user. The fourth aspect of the first example system may be implemented in combination with the first, second, and/or third aspect of the first example system, though the example embodiments are not limited in this respect.

In an implementation of the fourth aspect, the one or more processors are configured to generate the user-specific digital signature by generating a hash that is based at least in part on the user-specific information, which is obtained from the user as a result of initiating or receiving the request, and that is further based at least in part on the one or more inherence factors, which identify the user and which were captured during the attempt of the user to log into the computing device, the application, or the service. In accordance with this implementation, the one or more processors are configured to selectively authenticate the user in accordance with the multi-factor authentication technique based at least in part on whether the hash matches a reference hash associated with the reference user.

In a fifth aspect of the first example system, the one or more processors are configured to selectively authenticate the user in accordance with the multi-factor authentication technique based at least in part on whether a device identifier of a computing device of the user from which the request is received matches a reference device identifier. The fifth aspect of the first example system may be implemented in combination with the first, second, third, and/or fourth aspect of the first example system, though the example embodiments are not limited in this respect.

In a sixth aspect of the first example system, a first subset of users is authorized to perform the operation in a first environment. In accordance with the sixth aspect, a second subset of the users is authorized to perform the operation in a second environment and is not authorized to perform the operation in the first environment. In further accordance with the sixth aspect, the user-specific information is obtained from the user as a result of initiating or receiving the request to perform the operation with regard to the code in the first environment prior to or during the release of the code. In further accordance with the sixth aspect, the one or more processors are configured to authenticate the user in accordance with the multi-factor authentication technique based at least in part on the user-specific digital signature that identifies the user matching a reference digital signature that identifies the reference user who is included in the first subset. In further accordance with the sixth aspect, the one or more processors are configured to enable the performance of the operation with regard to the code in the first environment based at least in part on the user being authenticated in accordance with the multi-factor authentication technique. The sixth aspect of the first example system may be implemented in combination with the first, second, third, fourth, and/or fifth aspect of the first example system, though the example embodiments are not limited in this respect.

In a seventh aspect of the first example system, the operation comprises at least one of the following: checking-in the code to a repository associated with the code development service; performing a review of the code; performing a build of the code; signing the code; releasing the code to end users; publishing the code to the end users; or deploying the code. The seventh aspect of the first example system may be implemented in combination with the first, second, third, fourth, fifth, and/or sixth aspect of the first example system, though the example embodiments are not limited in this respect.

A second example system to use inherence-based authentication to selectively enable performance of an operation prior to or during release of code comprises a memory and one or more processors coupled to the memory. The one or more processors are configured to generate a user-specific digital signature that identifies a user of a code development service based at least in part on one or more inherence identifiers of the user that are captured as a result of initiating a request to perform the operation with regard to the code prior to or during the release of the code or receiving the request from the user prior to or during the release of the code. The code includes at least one of software code or firmware code. Each inherence identifier indicates something that the user is or does. The one or more processors are further configured to selectively enable the performance of the operation with regard to the code based at least in part on whether the user-specific digital signature that identifies the user matches a reference digital signature that identifies a reference user who is authorized to perform the operation with regard to the code.

In a first aspect of the second example system, the one or more processors are configured to generate the user-specific digital signature by generating a hash that is based at least in part on the one or more inherence identifiers of the user that are captured a result of initiating or receiving the request. In accordance with the first aspect, the one or more processors are configured to selectively enable the performance of the operation with regard to the code based at least in part on whether the hash matches a reference hash associated with the reference user.

In a second aspect of the second example system, the one or more processors are further configured to sign the code with the user-specific digital signature. The second aspect of the second example system may be implemented in combination with the first aspect of the second example system, though the example embodiments are not limited in this respect.

In a third aspect of the second example system, the one or more processors are configured to selectively enable the performance of the operation with regard to the code based at least in part on whether the user satisfies a plurality of factors of a multi-factor authentication technique. The multi-factor authentication technique includes a first factor that requires the user-specific digital signature that identifies the user to match the reference digital signature that identifies the reference user who is authorized to perform the operation with regard to the code. The third aspect of the second example system may be implemented in combination with the first and/or second aspect of the second example system, though the example embodiments are not limited in this respect.

In a first implementation of the third aspect, the multi-factor authentication technique includes a second factor that requires information stored in an item that is in possession of the user to match reference information associated with the user.

In a second implementation of the third aspect, the multi-factor authentication technique includes a second factor that requires one or more second inherence identifiers, which identify the user and which were captured during an attempt of the user to log into a computing device, an application, or a service, to match one or more respective reference inherence identifiers that identify the reference user.

In an example of the second implementation of the third aspect, the one or more processors are configured to generate the user-specific digital signature by generating a hash that is based at least in part on the one or more inherence identifiers, which identify the user and which are captured a result of initiating or receiving the request, and that is further based at least in part on the one or more second inherence identifiers of the user, which were captured during the attempt of the user to log into the computing device, the application, or the service. In accordance with this example, the one or more processors are configured to selectively enable the performance of the operation with regard to the code based at least in part on whether the hash matches a reference hash associated with the reference user.

In a third implementation of the third aspect, the multi-factor authentication technique includes a second factor that requires a device identifier of a computing device of the user from which the request is received to match a reference device identifier.

In a fourth aspect of the second example system, a first subset of users is authorized to perform the operation in a first environment. In accordance with the fourth aspect, a second subset of the users is authorized to perform the operation in a second environment and is not authorized to perform the operation in the first environment. In further accordance with the fourth aspect, the one or more inherence identifiers of the user are captured as a result of initiating or receiving the request to perform the operation with regard to the code in the first environment prior to or during the release of the code. In further accordance with the fourth aspect, the one or more processors are configured to enable the performance of the operation with regard to the code in the first environment based at least in part on the user-specific digital signature that identifies the user matching the reference digital signature that identifies the reference user who is included in the first subset. The fourth aspect of the second example system may be implemented in combination with the first, second, and/or third aspect of the second example system, though the example embodiments are not limited in this respect.

In a fifth aspect of the second example system, the operation comprises at least one of the following: checking-in the code to a repository associated with the code development service; performing a review of the code; performing a build of the code; signing the code; releasing the code to end users; publishing the code to the end users; or deploying the code. The fifth aspect of the second example system may be implemented in combination with the first, second, third, and/or fourth aspect of the second example system, though the example embodiments are not limited in this respect.

In a sixth aspect of the second example system, the one or more inherence identifiers of the user represent at least one of the following: a face of the user; a fingerprint of the user; a voice of the user; an iris of an eye of the user; or a pattern of key press intervals of the user. The sixth aspect of the second example system may be implemented in combination with the first, second, third, fourth, and/or fifth aspect of the second example system, though the example embodiments are not limited in this respect.

A first example method of using multi-factor authentication to selectively enable performance of an operation prior to or during release of code comprises, prior to or during the release of the code, initiating a request to perform the operation with regard to the code or receiving the request from a user of a code development service. The code includes at least one of software code or firmware code. The first method further comprises generating a user-specific digital signature that identifies the user based at least in part on user-specific information, which is obtained from the user as a result of initiating or receiving the request. The first method further comprises selectively authenticating the user in accordance with a multi-factor authentication technique that requires a plurality of factors that are received from the user to match a plurality of reference factors, which identify a reference user who is authorized to perform the operation with regard to the code, based at least in part on whether the user-specific digital signature that identifies the user matches a reference digital signature that identifies the reference user. The first method further comprises selectively enabling the performance of the operation with regard to the code based at least in part on whether the user is authenticated in accordance with the multi-factor authentication technique.

In a first aspect of the first example method, generating the user-specific digital signature that identifies the user comprises generating a hash that is based at least in part on the user-specific information. In accordance with the first aspect, selectively authenticating the user comprises selectively authenticating the user in accordance with the multi-factor authentication technique based at least in part on whether the hash matches a reference hash associated with the reference user.

In a second aspect of the first example method, the first example method further comprises signing the code with the user-specific digital signature. The second aspect of the first example method may be implemented in combination with the first aspect of the first example method, though the example embodiments are not limited in this respect.

In a third aspect of the first example method, the user-specific information is obtained from an item that is in possession of the user as a result of initiating or receiving the request. The third aspect of the first example method may be implemented in combination with the first and/or second aspect of the first example method, though the example embodiments are not limited in this respect.

In a fourth aspect of the first example method, selectively authenticating the user comprises selectively authenticating the user in accordance with the multi-factor authentication technique based at least in part on whether one or more inherence factors, which identify the user and which were captured during an attempt of the user to log into a computing device, an application, or a service, match one or more respective reference inherence factors that identify the reference user. The fourth aspect of the first example method may be implemented in combination with the first, second, and/or third aspect of the first example method, though the example embodiments are not limited in this respect.

In an implementation of the fourth aspect, generating the user-specific digital signature that identifies the user comprises generating a hash that is based at least in part on the user-specific information, which is obtained from the user as a result of initiating or receiving the request, and that is further based at least in part on the one or more inherence factors, which identify the user and which were captured during the attempt of the user to log into the computing device, the application, or the service. In accordance with this implementation, selectively authenticating the user comprises selectively authenticating the user in accordance with the multi-factor authentication technique based at least in part on whether the hash matches a reference hash associated with the reference user.

In a fifth aspect of the first example method, selectively authenticating the user comprises selectively authenticating the user in accordance with the multi-factor authentication technique based at least in part on whether a device identifier of a computing device of the user from which the request is received matches a reference device identifier. The fifth aspect of the first example method may be implemented in combination with the first, second, third, and/or fourth aspect of the first example method, though the example embodiments are not limited in this respect.

In a sixth aspect of the first example method, a first subset of users is authorized to perform the operation in a first environment. In accordance with the sixth aspect, a second subset of the users is authorized to perform the operation in a second environment and is not authorized to perform the operation in the first environment. In further accordance with the sixth aspect, initiating or receiving the request comprises initiating or receiving the request to perform the operation with regard to the code in the first environment. In further accordance with the sixth aspect, selectively authenticating the user comprises authenticating the user in accordance with the multi-factor authentication technique based at least in part on the user-specific digital signature that identifies the user matching a reference digital signature that identifies the reference user who is included in the first subset. In further accordance with the sixth aspect, selectively enabling the performance of the operation with regard to the code comprises enabling the performance of the operation with regard to the code in the first environment based at least in part on the user being authenticated in accordance with the multi-factor authentication technique. The sixth aspect of the first example method may be implemented in combination with the first, second, third, fourth, and/or fifth aspect of the first example method, though the example embodiments are not limited in this respect.

In a seventh aspect of the first example method, the operation comprises at least one of the following: checking-in the code to a repository associated with the code development service; performing a review of the code; performing a build of the code; signing the code; releasing the code to end users; publishing the code to the end users; or deploying the code. The seventh aspect of the first example method may be implemented in combination with the first, second, third, fourth, fifth, and/or sixth aspect of the first example method, though the example embodiments are not limited in this respect.

A second example method of using inherence-based authentication to selectively enable performance of an operation prior to or during release of code comprises, prior to or during the release of the code, initiating a request to perform the operation with regard to the code or receiving the request from a user of a code development service. The code includes at least one of software code or firmware code. The second example method further comprises generating a user-specific digital signature that identifies the user based at least in part on one or more inherence identifiers of the user that are captured as a result of initiating or receiving the request. Each inherence identifier indicates something that the user is or does. The second example method further comprises selectively enabling the performance of the operation with regard to the code based at least in part on whether the user-specific digital signature that identifies the user matches a reference digital signature that identifies a reference user who is authorized to perform the operation with regard to the code.

In a first aspect of the second example method, generating the user-specific digital signature that identifies the user comprises generating a hash that is based at least in part on the one or more inherence identifiers of the user that are captured a result of initiating or receiving the request. In accordance with the first aspect, selectively enabling the performance of the operation with regard to the code comprises selectively enabling the performance of the operation with regard to the code based at least in part on whether the hash matches a reference hash associated with the reference user.

In a second aspect of the second example method, the second example method further comprises signing the code with the user-specific digital signature. The second aspect of the second example method may be implemented in combination with the first aspect of the second example method, though the example embodiments are not limited in this respect.

In a third aspect of the second example method, selectively enabling the performance of the operation with regard to the code comprises selectively enabling the performance of the operation with regard to the code based at least in part on whether the user satisfies a plurality of factors of a multi-factor authentication technique. In accordance with the third aspect, the multi-factor authentication technique includes a first factor that requires the user-specific digital signature that identifies the user to match the reference digital signature that identifies the reference user who is authorized to perform the operation with regard to the code. The third aspect of the second example method may be implemented in combination with the first and/or second aspect of the second example method, though the example embodiments are not limited in this respect.

In a first implementation of the third aspect, the multi-factor authentication technique includes a second factor that requires information stored in an item that is in possession of the user to match reference information associated with the user.

In a second implementation of the third aspect, the multi-factor authentication technique includes a second factor that requires one or more second inherence identifiers, which identify the user and which were captured during an attempt of the user to log into a computing device, an application, or a service, to match one or more respective reference inherence identifiers that identify the reference user.

In an example of the second implementation, generating the user-specific digital signature that identifies the user comprises generating a hash that is based at least in part on the one or more inherence identifiers, which identify the user and which are captured a result of initiating or receiving the request, and that is further based at least in part on the one or more second inherence identifiers of the user, which were captured during the attempt of the user to log into the computing device, the application, or the service. In accordance with this example, selectively enabling the performance of the operation with regard to the code comprises selectively enabling the performance of the operation with regard to the code based at least in part on whether the hash matches a reference hash associated with the reference user.

In a third implementation of the third aspect, the multi-factor authentication technique includes a second factor that requires a device identifier of a computing device of the user from which the request is received to match a reference device identifier.

In a fourth aspect of the second example method, a first subset of users is authorized to perform the operation in a first environment. In accordance with the fourth aspect, a second subset of the users is authorized to perform the operation in a second environment and is not authorized to perform the operation in the first environment. In further accordance with the fourth aspect, initiating or receiving the request comprises initiating or receiving the request to perform the operation with regard to the code in the first environment. In further accordance with the fourth aspect, selectively enabling the performance of the operation comprises enabling the performance of the operation with regard to the code in the first environment based at least in part on the user-specific digital signature that identifies the user matching the reference digital signature that identifies the reference user who is included in the first subset. The fourth aspect of the second example method may be implemented in combination with the first, second, and/or third aspect of the second example method, though the example embodiments are not limited in this respect.

In a fifth aspect of the second example method, the operation comprises at least one of the following: checking-in the code to a repository associated with the code development service; performing a review of the code; performing a build of the code; signing the code; releasing the code to end users; publishing the code to the end users; or deploying the code. The fifth aspect of the second example method may be implemented in combination with the first, second, third, and/or fourth aspect of the second example method, though the example embodiments are not limited in this respect.

In a sixth aspect of the second example method, the one or more inherence identifiers of the user represent at least one of the following: a face of the user; a fingerprint of the user; a voice of the user; an iris of an eye of the user; or a pattern of key press intervals of the user. The sixth aspect of the second example method may be implemented in combination with the first, second, third, fourth, and/or fifth aspect of the second example method, though the example embodiments are not limited in this respect.

A first example computer program product comprises a computer-readable storage medium having instructions recorded thereon for enabling a processor-based system to use multi-factor authentication to selectively enable performance of an operation prior to or during release of code by performing operations. The operations comprise generating a user-specific digital signature that identifies a user of a code development service based at least in part on user-specific information, which is obtained from the user as a result of initiating a request to perform the operation with regard to the code prior to or during the release of the code or receiving the request from the user prior to or during the release of the code, the code including at least one of software code or firmware code. The operations further comprise selectively authenticating the user in accordance with a multi-factor authentication technique that requires a plurality of factors that are received from the user to match a plurality of reference factors, which identify a reference user who is authorized to perform the operation with regard to the code, based at least in part on whether the user-specific digital signature of the user matches a reference digital signature that identifies the reference user. The operations further comprise selectively enabling the performance of the operation with regard to the code based at least in part on whether the user is authenticated in accordance with the multi-factor authentication technique.

A second example computer program product comprises a computer-readable storage medium having instructions recorded thereon for enabling a processor-based system to use inherence-based authentication to selectively enable performance of an operation prior to or during release of code by performing operations. The operations comprise generating a user-specific digital signature that identifies a user of a code development service based at least in part on one or more inherence identifiers of the user that are captured as a result of initiating a request to perform the operation with regard to the code prior to or during the release of the code or receiving the request from the user prior to or during the release of the code. The code includes at least one of software code or firmware code, each inherence identifier indicating something that the user is or does. The operations further comprise selectively enabling the performance of the operation with regard to the code based at least in part on whether the user-specific digital signature that identifies the user matches a reference digital signature that identifies a reference user who is authorized to perform the operation with regard to the code.

IV. Example Computer System

Figure 8:
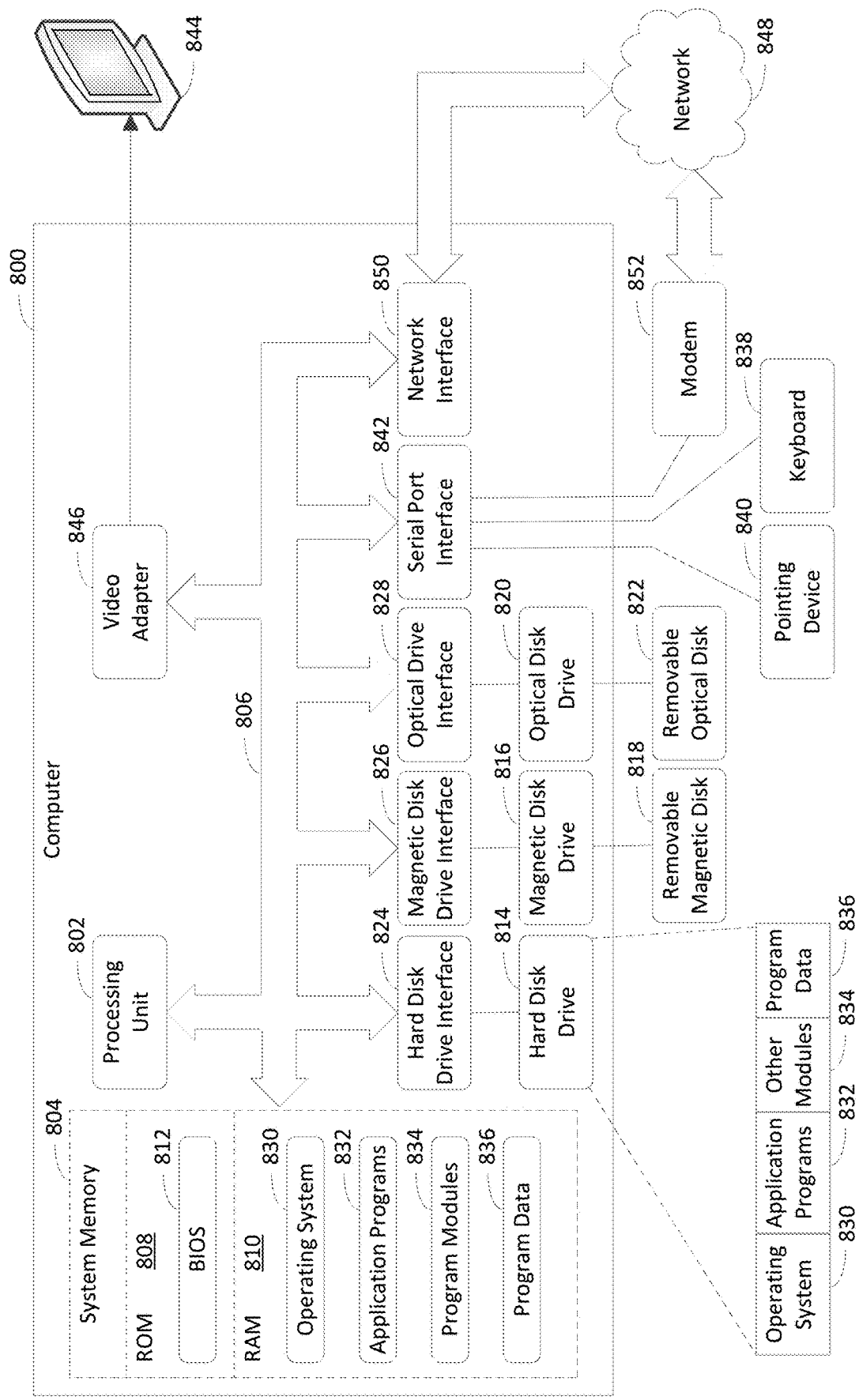
FIG. 8 depicts an example computer in which embodiments may be implemented.

FIG. 8 depicts an example computer 800 in which embodiments may be implemented. Any one or more of the user systems 102A-102M and/or any one or more of the nodes 106A-106N shown in FIG. 1; the computing system 400 shown in FIG. 4; and/or the computing system 600 shown in FIG. 6 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of the selective performance logic 112, the digital signature logic 402, the multi-factor authentication logic 404, the performance logic 406, the selective performance logic 412, the digital signature logic 602, the inherence-based authentication logic 604, the performance logic 606, the selective performance logic 612, flowchart 300 (including any step of flowchart 300), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use multi-factor authentication to selectively enable performance of a build of code prior to or during release of the code, the system comprising:
   memory; and
   one or more processors coupled to the memory, the one or more processors configured to:
      generate a user-specific digital signature that identifies a user of a code development service based at least in part on user-specific information, which is obtained from the user as a result of initiating a request to perform the build of the code in a first environment prior to or during the release of the code or receiving the request from the user prior to or during the release of the code, the code comprising at least one of software code or firmware code, wherein a first subset of users is authorized to perform the build of the code in the first environment, wherein a second subset of the users is authorized to perform the build of the code in a second environment and is not authorized to perform the build of the code in the first environment;
      authenticate the user in accordance with a multi-factor authentication technique that requires a plurality of factors that are received from the user to match a plurality of reference factors, which identify a reference user who is authorized to perform the build of the code in the first environment, based at least in part on the user-specific digital signature that identifies the user matching a reference digital signature that identifies the reference user who is comprised in the first subset; and
      based at least in part on the user being authenticated in accordance with the multi-factor authentication technique, enable the performance of the build of the code in the first environment, the performance of the build of the code in the first environment comprising conversion of a source code file of the code into one or more standalone software artifacts that are configured to be run on a computing device.

2. The system of claim 1, wherein the one or more processors are configured to:
   generate the user-specific digital signature by generating a hash that is based at least in part on the user-specific information; and
   authenticate the user in accordance with the multi-factor authentication technique based at least in part on the hash matching a reference hash associated with the reference user.

3. The system of claim 1, wherein the one or more processors are configured to:
   generate the user-specific digital signature by generating a hash that is based at least in part on the user-specific information, which is obtained from the user as the result of initiating or receiving the request, and that is further based at least in part on one or more inherence factors, which identify the user and which were captured during an attempt of the user to log into a computing device, an application, or a service; and
   selectively authenticate the user in accordance with the multi-factor authentication technique based at least in part on whether the hash matching a reference hash associated with the reference user.

4. The system of claim 1, wherein the one or more processors are configured to:
   authenticate the user in accordance with the multi-factor authentication technique based at least in part on a device identifier of a computing device of the user from which the request is received matching a reference device identifier.

5. The system of claim 1, wherein the first environment is a pre-production environment; and
   wherein the second environment is a post-production environment.

6. A system to use inherence-based authentication to selectively enable performance of a build of code prior to or during release of the code, the system comprising:
   memory; and
   one or more processors coupled to the memory, the one or more processors configured to:
      generate a user-specific digital signature that identifies a user of a code development service based at least in part on one or more inherence identifiers of the user that are captured as a result of initiating a request to perform the build of the code in a first environment prior to or during the release of the code or receiving the request from the user prior to or during the release of the code, the code comprising at least one of software code or firmware code, wherein an inherence identifier indicates something that the user is or does, wherein a first subset of users is authorized to perform the build of the code in the first environment, wherein a second subset of the users is authorized to perform the build of the code in a second environment and is not authorized to perform the build of the code in the first environment; and based at least in part on the user-specific digital signature that identifies the user matching a reference digital signature that identifies a reference user who is comprised in the first subset, enable the performance of the build of the code in the first environment, the performance of the build of the code in the first environment comprising conversion of a source code file of the code into one or more standalone software artifacts that are configured to be run on a computing device.

7. A method of using multi-factor authentication to selectively enable performance of a build of code prior to or during release of the code, the method comprising:

prior to or during the release of the code, initiating a request to perform the build of the code in a first environment or receiving the request from a user of a code development service, the code comprising at least one of software code or firmware code, wherein a first subset of users is authorized to perform the build of the code in the first environment, wherein a second subset of the users is authorized to perform the build of the code in a second environment and is not authorized to perform the build of the code in the first environment;

generating a user-specific digital signature that identifies the user based at least in part on user-specific information, which is obtained from the user as a result of initiating or receiving the request;

authenticating the user in accordance with a multi-factor authentication technique that requires a plurality of factors that are received from the user to match a plurality of reference factors, which identify a reference user who is authorized to perform the build of the code in the first environment, based at least in part on the user-specific digital signature that identifies the user matching a reference digital signature that identifies the reference user who is comprised in the first subset;

based at least in part on the user being authenticated in accordance with the multi-factor authentication technique, enabling the performance of the build of the code in the first environment, the performance of the build of the code in the first environment comprising conversion of a source code file of the code into one or more standalone software artifacts that are configured to be run on a computing device.

8. The method of claim 7, further comprising:

based at least in part on the user being authenticated in accordance with the multi-factor authentication technique, enabling dependencies to be incorporated into the code, the performance of the build of the code comprising incorporation of the dependencies into the code.

9. The method of claim 7, further comprising:

based at least in part on the user being authenticated in accordance with the multi-factor authentication technique, enabling dependencies to be incorporated into the code; and based at least in part on the user being authenticated in accordance with the multi-factor authentication technique, enabling signing of the code;

wherein the performance of the build of the code comprises incorporation of the dependencies into the code and the signing of the code.

10. The system of claim 6, wherein the first environment is a pre-production environment; and wherein the second environment is a post-production environment.

11. The system of claim 10, wherein the one or more processors are configured to:

generate the user-specific digital signature by generating a hash that is based at least in part on the one or more inherence identifiers of the user that are captured as the result of initiating or receiving the request; and based at least in part on the hash matching a reference hash associated with the reference user, enable the performance of the build of the code in the first environment.

12. The system of claim 10, wherein the one or more processors are configured to:

based at least in part on the user satisfying a plurality of factors of a multi-factor authentication technique, enable the performance of the build of the code in the first environment, the multi-factor authentication technique comprising a first factor that requires the user-specific digital signature that identifies the user to match the reference digital signature that identifies the reference user who is comprised in the first subset.

13. The system of claim 12, wherein the multi-factor authentication technique comprises a second factor that requires information stored in an item that is in possession of the user to match reference information associated with the user.

14. The system of claim 12, wherein the multi-factor authentication technique comprises a second factor that requires one or more second inherence identifiers, which identify the user and which were captured during an attempt of the user to log into a computing device, an application, or a service, to match one or more respective reference inherence identifiers that identify the reference user.

15. The system of claim 14, wherein the one or more processors are configured to:

generate the user-specific digital signature by generating a hash that is based at least in part on the one or more inherence identifiers, which identify the user and which are captured as the result of initiating or receiving the request, and that is further based at least in part on the one or more second inherence identifiers of the user, which were captured during the attempt of the user to log into the computing device, the application, or the service; and based at least in part on the hash matching a reference hash associated with the reference user, enable the performance of the build of the code in the first environment.

16. The system of claim 10, wherein the one or more inherence identifiers of the user represent a face of the user.

17. The system of claim 10, wherein the one or more inherence identifiers of the user represent a voice of the user.

18. The system of claim 10, wherein the performance of the build of the code comprises signing the code with the user-specific digital signature.

19. The system of claim 10, wherein the one or more inherence identifiers of the user represent a pattern of key press intervals of the user.

20. The system of claim 10, wherein the one or more processors are further configured to:
    generate a record in a blockchain to memorialize the performance of the build of the code.

\* \* \* \* \*